United States Patent
Hong

(10) Patent No.: US 9,825,786 B2
(45) Date of Patent: Nov. 21, 2017

(54) APPARATUS AND METHOD FOR TRANSMITTING AND RECEIVING DATA IN COMMUNICATION SYSTEM

(71) Applicant: Samsung Electronics Co., Ltd, Gyeonggi-do (KR)

(72) Inventor: Seongbeom Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/338,310

(22) Filed: Oct. 28, 2016

(65) Prior Publication Data

US 2017/0126442 A1    May 4, 2017

(30) Foreign Application Priority Data

Oct. 29, 2015   (KR) .......................... 10-2015-0151181

(51) Int. Cl.
*H04L 25/03* (2006.01)
*H04L 1/00* (2006.01)

(52) U.S. Cl.
CPC ...... *H04L 25/03343* (2013.01); *H04L 1/0084* (2013.01)

(58) Field of Classification Search
CPC ......... H04L 25/03006; H04L 25/03343; H04L 25/0335; H04L 25/03821; H04L 1/0078; H04L 1/0079; H04L 1/0084; H04L 1/009; H04L 1/0091
USPC ....... 375/259, 260, 285, 295, 296, 316, 340, 375/346, 348
See application file for complete search history.

(56) References Cited

U.S. PATENT DOCUMENTS

| | | | | |
|---|---|---|---|---|
| 6,449,246 | B1* | 9/2002 | Barton | H04L 5/023 370/206 |
| 6,788,752 | B1* | 9/2004 | Andre | H04L 25/0202 375/348 |
| 8,526,523 | B1* | 9/2013 | Eliaz | H04L 25/03178 375/261 |
| 2008/0291972 | A1* | 11/2008 | Chin Po Shin | H04B 1/7103 375/130 |
| 2011/0096810 | A1* | 4/2011 | Suehiro | H04B 1/7103 375/130 |

(Continued)

FOREIGN PATENT DOCUMENTS

| JP | 2013-236302 | 11/2013 |
|---|---|---|
| JP | 2015-167336 | 9/2015 |

*Primary Examiner* — Siu Lee

(57) ABSTRACT

A method for transmitting and receiving data in a communication system includes adding symbols to both ends of a transmitted signal block, filtering the transmitted signal block, removing the symbols from the filtered transmitted signal block and transmitting the transmitted signal block to a receiver through a channel. A transmitter includes a controller configured to add symbols to both ends of a transmitted signal block through the symbol adder, filter the transmitted signal block, remove the symbols from the filtered transmitted signal block through the symbol remover, and transmit the transmitted signal block through the transceiver to a receiver through a channel. A receiver includes a controller configured to add symbols to both ends of the received signal block through the symbol adder, filter the received signal block and reconstruct data from the received signal block.

15 Claims, 32 Drawing Sheets

(56) References Cited

U.S. PATENT DOCUMENTS

2015/0139356 A1* 5/2015 Song .................. H04L 27/264
                                                              375/296
2015/0263822 A1   9/2015 Abdoli et al.
2016/0308697 A1* 10/2016 Gattami ............... H04L 25/497
2017/0099173 A1*  4/2017 Yun ..................... H04B 1/04

* cited by examiner

APPARATUS AND METHOD FOR TRANSMITTING AND RECEIVING DATA IN COMMUNICATION SYSTEM

CROSS-REFERENCE TO RELATED APPLICATION(S) AND CLAIM OF PRIORITY

The present application is related to and claims the priority under 35 U.S.C. §119(a) to Korean Application Serial No. 10-2015-0151181, which was filed in the Korean Intellectual Property Office on Oct. 29, 2015, the entire content of which is hereby incorporated by reference.

TECHNICAL FIELD

The present disclosure relates to an apparatus and a method for transmitting and receiving data in a communication system.

BACKGROUND

Demands for improvement in system capacity are growing due to an increase in the amount of data used by users. A non-orthogonal transmission scheme is considered to be a solution to such demands. In particular, faster-than-Nyquist (FTN) signaling is favored as a non-orthogonal transmission method for increasing a data rate while simultaneously improving spectrum efficiency.

Here, FTN signaling is a transmission scheme in which symbols are transmitted at a rate higher than the Nyquist rate at which orthogonality between symbols is satisfied. That is, FTN signaling is a transmission scheme of transmitting time-domain sampling pulses at an artificially faster symbol rate than Nyquist signaling in order to break orthogonality between symbols.

SUMMARY

However, since FTN signaling transmits symbols at a rate higher than the Nyquist rate, inter-symbol interference (ISI) occurs. Further, ISI causes the occurrence of inter-block interference (MI) in a block-based transmission system. Since IBI damages data, a method for eliminating IBI is additionally needed.

To address the above-discussed deficiencies, it is a primary object to provide a method and an apparatus for eliminating IBI from a block using the addition and removal of symbols.

Another exemplary embodiment of the present disclosure proposes a method and an apparatus for equalizing a block in view of both ISI caused by FTN and ISI caused by a channel in order to reduce the computational complexity of a receiver.

Further, still another exemplary embodiment of the present disclosure proposes a method and an apparatus for transmitting a block via PE in view of ISI in order to reduce the computational complexity of a receiver.

In addition, yet another exemplary embodiment of the present disclosure proposes a method and an apparatus for allowing a transmitter to pre-equalize a block in view of ISI and allowing a receiver to additionally equalize the block in view of remaining ISI in order to reduce the computational complexity of the receiver.

An operating method of a transmitter according to an exemplary embodiment of the present disclosure may include: adding symbols to both ends of a transmitted signal block; filtering the transmitted signal block; removing the symbols from the filtered transmitted signal block; and transmitting the transmitted signal block to a receiver through a channel.

An operating method of a receiver according to an exemplary embodiment of the present disclosure may include: adding symbols to both ends of a received signal block received from a transmitter through a channel; filtering the received signal block; removing the symbols from the filtered received signal block; and reconstructing data from the received signal block.

A transmitter according to an exemplary embodiment of the present disclosure may include: a transceiver; a symbol adder configured to add symbols; a symbol remover configured to remove the symbols; and a controller configured to add symbols to both ends of a transmitted signal block through the symbol adder, to filter the transmitted signal block, to remove the symbols from the filtered transmitted signal block through the symbol remover, and to transmit the transmitted signal block through the transceiver to a receiver through a channel.

A receiver according to an exemplary embodiment of the present disclosure may include: a transceiver; a symbol adder configured to add symbols; a symbol remover configured to remove the symbols; and a controller configured to receive a received signal block through the transceiver from a transmitter through a channel, to add symbols to both ends of the received signal block through the symbol adder, to filter the received signal block, to remove the symbols from the filtered received signal block through the symbol remover, and to reconstruct data from the received signal block.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
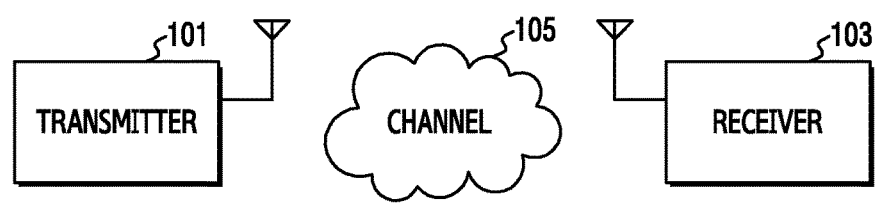
FIG. 1 is a diagram of a communication system according to an exemplary embodiment of the present disclosure.

FIGS. 1 through 32, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

FIG. 1 is a diagram of a communication system according to an exemplary embodiment of the present disclosure.

Referring to FIG. 1, a communication system includes a transmitter 101, a receiver 103, and a channel 105.

Describing each component, the channel 105 is a transmission path for carrying data and can carry data, transmitted from the transmitter 101, to the receiver 103.

The transmitter 101 can generate data and can transmit the generated data through the channel 105. For example, the transmitter 101 can generate and transmit data using faster-than-Nyquist (FTN) signaling. Here, FTN signaling is a transmission scheme in which symbols are transmitted at a rate higher than a Nyquist rate at which orthogonality between symbols is satisfied. That is, FTN signaling is a transmission scheme of transmitting time-domain sampling pulses at an artificially faster symbol rate than Nyquist signaling in order to break orthogonality between symbols.

Here, Nyquist signaling is a transmission scheme of transmitting symbols at the Nyquist rate.

Since FTN signaling transmits symbols faster than Nyquist signaling, the transmitter 101 can reduce signaling time between transmitted symbols. Due to the reduction in signaling time between symbols, FTN signaling can improve spectral efficiency while allowing an increase in data rate of the transmitter 101.

However, since FTN signaling transmits symbols at a rate higher than the Nyquist rate, inter-symbol interference (ISI) inevitably occurs. Since the transmitter 101 transmits data based on a unit of a block including a plurality of symbols (for example, a transmitted signal block), not a unit of a symbol, inter-block interference (IBI) occurs in the transmitter 101.

For example, to eliminate IBI, the transmitter 101 can add a cyclic prefix (CP) and a cyclic suffix (CS) (hereinafter referred to as an "FTN CP and CS") to a transmitted signal block at a front end of a pulse shaping filter employing FTN signaling. The transmitter 101 can perform FTN on the FTN CP and CS-added transmitted signal block through the pulse shaping filter. Here, the transmit 101 can remove the FTN CP and CS from the FTN CP and CS-added transmitted signal block at a rear end of the pulse shaping filter. That is, the transmitter 101 can perform FTN CP and CS addition and removal, thereby eliminating IBI by the pulse shaping filter from the transmitted signal block. The transmitter 101 can transmit the IBI-eliminated transmitted signal block to the receiver 103 through the channel 105.

The receiver 103 can receive data through the channel 105 and can reconstruct the received data. For example, the receiver 103 can receive and reconstruct data using FTN signaling.

For example, to eliminate IBI inevitably occurring in FTN signaling, the receiver 103 can add an FTN CP and CS to a received signal block at a front end of a matched filter employing FTN signaling. The receiver 103 can perform FTN on the FTN CP and CS-added received signal block through the matched filter. Here, the FTN CP and CS of the received signal block can include IBI caused by the matched filter performing FTN.

The receiver 103 can remove the FTN CP and CS from the FTN CP and CS-added received signal block at a rear end of the matched filter. That is, the receiver 103 can perform FTN CP and CS addition and removal, thereby eliminating IBI by the matched filter from the received signal block. The receiver 103 can reconstruct data using the IBI-eliminated received signal block.

Figure 2:
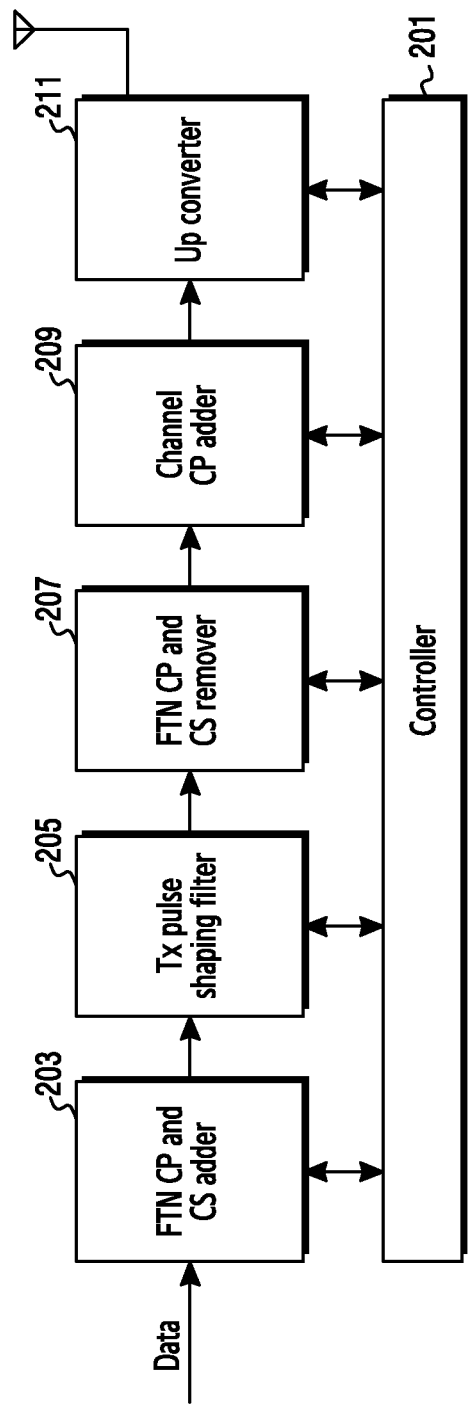
FIG. 2 is a block diagram of a transmitter according to a first exemplary embodiment of the present disclosure.

FIG. 2 is a block diagram of a transmitter according to a first exemplary embodiment of the present disclosure.

Referring to FIG. 2, a transmitter 101 can include a controller 201, an FTN CP and CS adder 203, a transmit (Tx) pulse shaping filter 205, an FTN CP and CS remover 207, a channel CP adder 209, and an up converter 211.

Describing each component, the FTN CP and CS adder 203 can receive data based on a unit of a transmitted signal block according to control by the controller 201. For example, a transmitted signal block can include encoded symbols. The FTN CP and CS adder 203 can add an FTN CP and CS to the received transmitted signal block to eliminate IBI caused by the Tx pulse shaping filter 205 and can output the FTN CP and CS-added transmitted signal block to the Tx pulse shaping filter 205.

Figure 3:
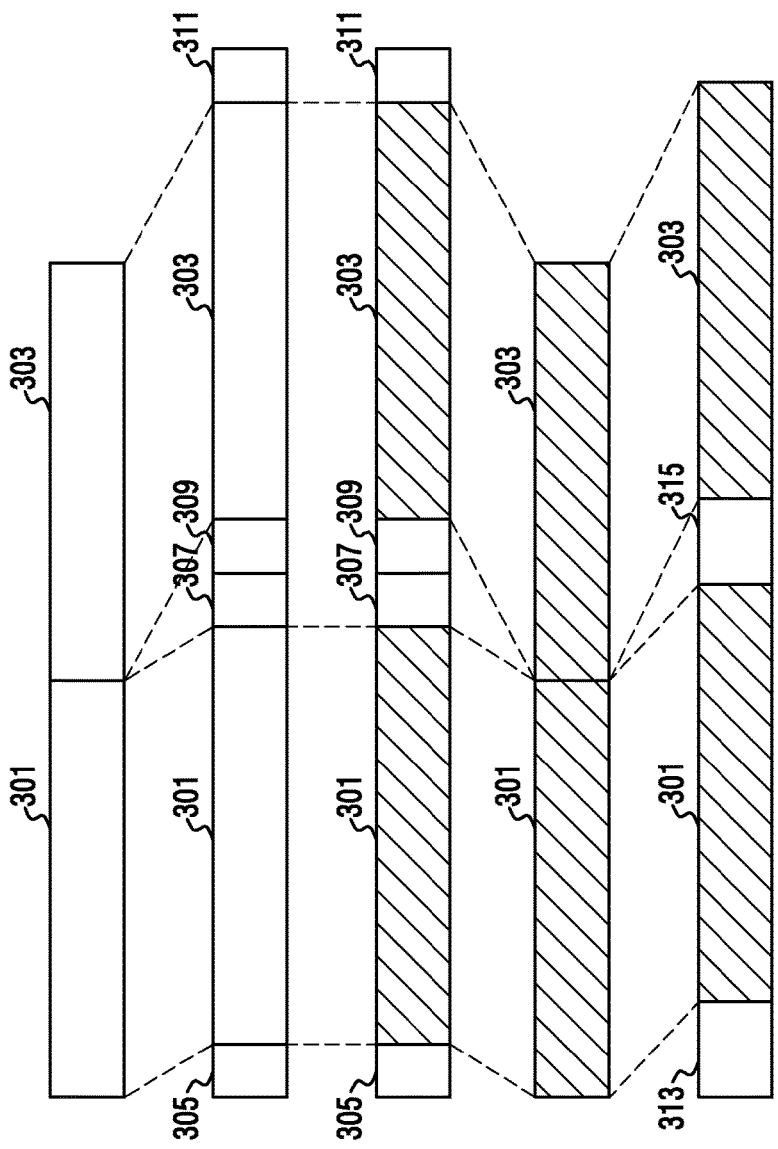
FIG. 3 illustrates a change process of a transmitted signal block in the transmitter according to the first exemplary embodiment of the present disclosure.

For example, as illustrated in FIG. 3, the FTN CP and CS adder 203 can receive successive transmitted signal blocks 301 and 303, can add a CP 305 to the front of the transmitted signal block 301, and can add a CS 307 to the rear thereof.

Further, the FTN CP and CS adder 203 can add a CP 309 to the front of the transmitted signal block 303 and can add a CS 311 to the rear thereof. For example, the lengths of the CPs and CSs can be determined based on the performance of the Tx pulse shaping filter 205, for example, the length of a tap. Here, the tap is the maximum time-axis length of the Tx pulse shaping filter 205 or a receive (Rx) matched filter and is determined by sampling. For example, referring to FIG. 32, the Tx pulse shaping filter 205 has the maximum amplitude in a ninth time sample, and a graph 3201 can have eight taps right and left based on the ninth time sample 3203.

For example, the FTN CP and CS adder 203 can generate an FTN CP and CS-added transmitted signal block using the following equation.

$$\bar{d} = C_p d \quad \text{[Equation 1]}$$

Here, $\bar{d}$ denotes an FTN CP and CS-added transmitted signal block and has an (N+2P) size. d denotes a transmitted signal block, $d=[d_0, \ldots, d_k, \ldots, d_{N-1}]^T \in \mathbb{C}^{N\times 1}$. $C_p$ denotes an FTN CP and CS adding matrix and has an (N+2P)×N size. P denotes the length of each of a CP and a CS.

The Tx pulse shaping filter 205 can receive the FTN CP and CS-added transmitted signal block, can filter the transmitted signal block in a base band, and can apply FTN to the filtered transmitted signal block according to control by the controller 201. For example, the Tx pulse shaping filter 205 can be a squeezed sampling pulse shaping filter.

For example, applying FTN to a transmitted signal block can mean transmitting a transmitted signal via sampling faster than the existing Nyquist rate. That is, applying FTN to a transmitted signal block can mean that the Tx pulse shaping filter transmits transmitted signals to overlap to be artificially non-orthogonal in terms of time (the existing Nyquist rate allows transmitted signals to be transmitted not to overlap in terms of time) so that the transmission is performed at an artificially faster symbol rate to break orthogonality between symbols.

For example, as illustrated in FIG. 3, the Tx pulse shaping filter 205 can filter the FTN CP and CS-added transmitted signal blocks 301 and 303 with a pulse-shaped filter for sampling, thereby generating the filtered transmitted signal blocks 301 and 303 (indicated with diagonal lines). For example, the FTN CP 305 and CS 307 of the transmitted signal block 301 can include ISI and IBI caused by the Tx pulse shaping filter 205 performing FTN. The FTN CP 309 and CS 311 of the transmitted signal block 303 can include IBI caused by the Tx pulse shaping filter 205 performing FTN. The Tx pulse shaping filter 205 can output the FTN-applied transmitted signal block to the FTN CP and CS remover 207.

For example, the Tx pulse shaping filter 205 can generate an FTN-applied transmitted signal block using the following equation.

$$\bar{t} = G_t \bar{d} \quad \text{[Equation 2]}$$

Here, $\bar{t}$ denotes an FTN-applied transmitted signal block and has an (N+2P) size, $\bar{t}=[t_{-P}, \ldots, t_0, \ldots, t_k, \ldots, t_{N+P-1}]^T$. $\bar{d}$ denotes an FTN CP and CS-added transmitted signal block. $G_t$ denotes an (N+2P)×(N+2P) Toeplitz matrix for a squeezed sampling pulse shaping filter and includes vectors $g_k=[0_k\ g\ 0_{N-k-1}]$, $G_t=[g_0, \ldots, g_k, \ldots, g_{N+2P-1}]$. 0k denotes a (1×k) zero vector, and 0N−k−1 denotes a 1×(N−k−1) zero vector when (N−k−1) is a positive integer.

The FTN CP and CS remover 207 can receive the FTN-applied transmitted signal block and can remove the FTN CP and CS from the received transmitted signal block according to control by the controller 201. For example, as illustrated in FIG. 3, the FTN CP and CS remover 207 can remove the FTN CP 305 and CS 307 from the transmitted signal block 301 filtered with the pulse-shaped filter for sampling and can remove the FTN CP 309 and CS 311 from the transmitted signal block 303 filtered with the pulse-shaped filter for sampling. The FTN CP and CS remover 207 can output the FTN CP and CS-removed transmitted signal block to the channel CP adder 209.

For example, the FTN CP and CS remover 207 can generate an FTN CP and CS-removed transmitted signal block using the following equation.

$$t = R_p \bar{t} = R_p \bar{t} = R_p G_t \bar{d} = R_p G_t C_p d = G_{tc} d \quad \text{[Equation 3]}$$

Here, t denotes an FTN CP and CS-removed transmitted signal block and has an (N×1) size, $t=[t_0, \ldots, t_k, \ldots, t_{N-1}]^T$. $R_p$ denotes an FTN CP and CS removing matrix and has an N×(N+2P) size. $G_{tc}$ denotes an (N×N) circulant matrix for $G_t$, $G_{tc}=R_p G_t C_p$.

The channel CP adder 209 can receive the FTN CP and CS-removed transmitted signal block from the FTN CP and CS remover 207 and can add a CP for removing IBI caused by a channel (hereinafter, referred to as a channel CP) to the received transmitted signal block according to control by the controller 201. For example, as illustrated in FIG. 3, the channel CP adder 209 can add a channel CP 313 to the transmitted signal block 301 and can add a channel CP 315 to the transmitted signal block 303. The channel CP adder 209 can output the channel CP-added transmitted signal block to the up converter 211. For example, the channel CP can be a guard interval (GI) between transmitted blocks, and the length of the channel CP can be determined based on the length of a channel impulse response (CIR).

Suppose that the channel 105 is a frequency-adaptive channel, a multipath channel has a causal link, and the channel 105 has a normalized discrete CIR with a length of $L=T_m/(\rho T_s)$. Here, $T_m$ denotes a channel delay spread sampled at a squeezed sampling time $\rho T_s$. Further, suppose that channel coefficients are known to the receiver 103 and are constants during the entire transmission of blocks.

In this case, the channel CP adder 209 can generate a channel CP-added transmitted signal block using the following equation.

$$t' = C_L t \quad \text{[Equation 4]}$$

Here, t' denotes a channel CP-added transmitted signal block. t denotes an FTN CP and CS-removed transmitted signal block. $C_L$ denotes an (N+L−1)×1 channel CP adding matrix. If a channel CP has a symbol length of (L−1), $C_L$ can be represented by the following equation.

$$C_L = \begin{bmatrix} 0_{(L-1)\times(N-L+1)} & I_{L-1} \\ & I_N \end{bmatrix} \quad \text{[Equation 5]}$$

The up converter 211 can receive the channel CP-added transmitted signal block from the channel CP adder 209 and can modulate (for example, up-convert) the received transmitted signal block into a radio frequency (RF) in order to transmit the transmitted signal block through the channel 105 according to control by the controller 201.

The controller 201 can control overall operations of the transmitter 101. For example, the controller 201 can control the FTN CP and CS adder 203, the Tx pulse shaping filter 205, the FTN CP and CS remover 207, the channel CP adder 209, and the up converter 211.

For example, the controller 201 can add an FTN CP and CS to a transmitted signal block through the FTN CP and CS adder 203. The controller 201 can filter the FTN CP and CS-added transmitted signal block with a pulse-shaped filter for sampling and can perform FTN through the Tx pulse shaping filter 205. Here, the FTN CP and CS of the FTN-applied transmitted signal block can include IBI caused by the Tx pulse shaping filter 205 performing FTN. The controller 201 can remove the FTN CP and CS from the FTN-applied transmitted signal block through the FTN CP and CS remover 207.

The controller 201 can add a channel CP to the FTN CP and CS-removed transmitted signal block through the channel CP adder 209. The controller 201 can up-convert the channel CP-added transmitted signal block into an RF through the up converter 211 and can transmit the transmitted signal block through the channel 105.

Figure 4:
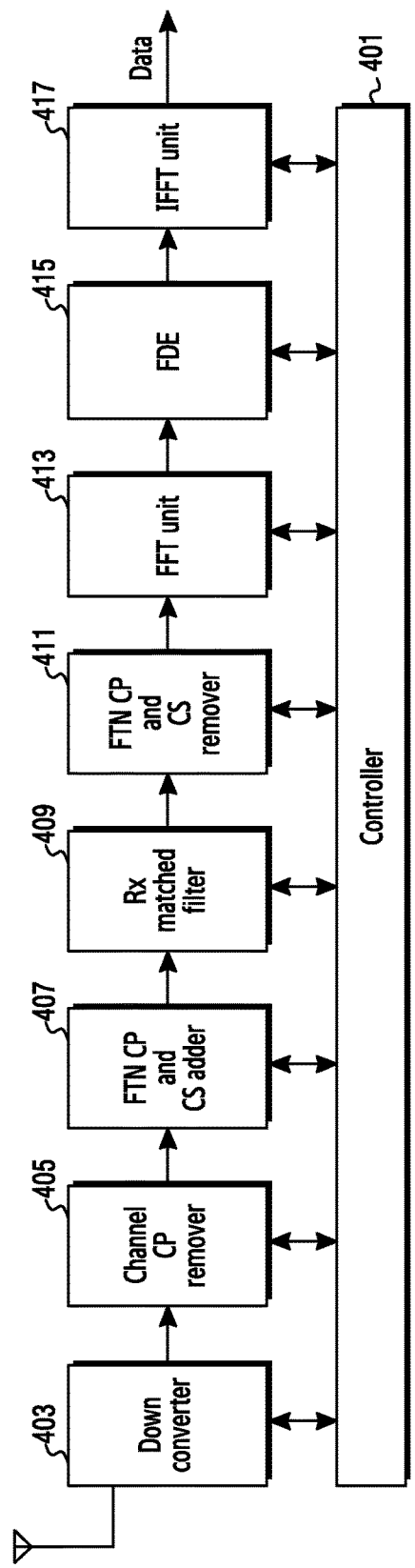
FIG. 4 is a block diagram of a receiver according to the first exemplary embodiment of the present disclosure.

FIG. 4 is a block diagram of a receiver according to the first exemplary embodiment of the present disclosure.

Referring to FIG. 4, a receiver 103 can include a controller 401, a down converter 403, a channel CP remover 405, an FTN CP and CS adder 407, an receive (Rx) matched filter 409, an FTN CP and CS remover 411, a fast Fourier transform (FFT) unit 413, a frequency-domain equalizer (FDE) 415, and an inverse FFT (IFFT) unit 417.

Figure 5:
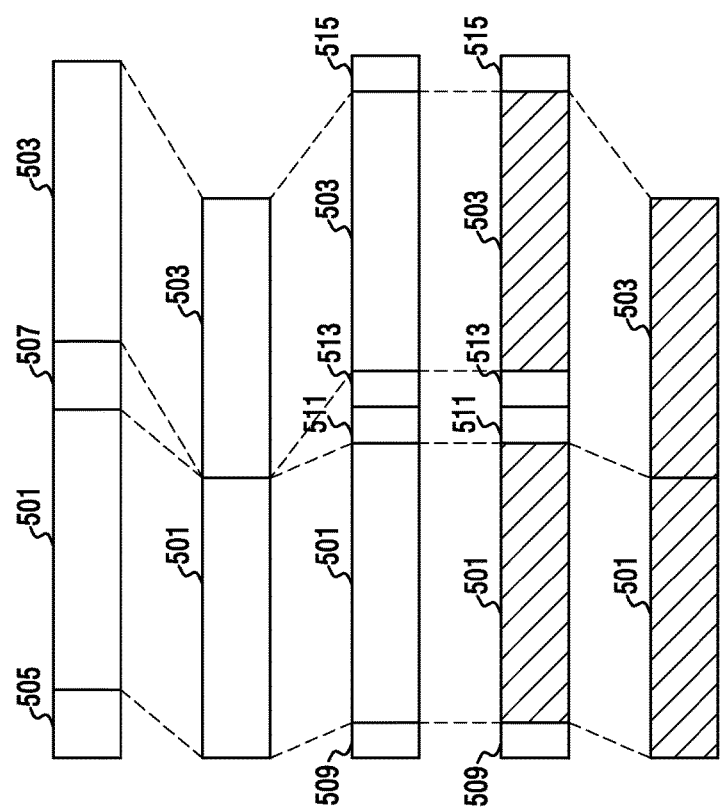
FIG. 5 illustrates a change process of a received signal block in the receiver according to the first exemplary embodiment of the present disclosure.

Describing each component, the down converter 403 can receive a received signal block via a receiving antenna and can down-convert the received signal block into a base band. For example, as illustrated in FIG. 5, the down converter 403 can receive a received signal block 501 with a channel CP 505 added and a received signal block 503 with a channel CP 507 added. For example, the received signal block can include a plurality of received symbols.

For example, the received signal block can be represented by the following equation.

$$x = Ht' + n_c \qquad \text{[Equation 6]}$$

Here, x denotes a received signal block and has an (N+L−1) length. Further, $x=[x_0, \ldots, x_k, \ldots, x_N, \ldots, x_{N+L-1}]^T$. L−1 denotes the length of a channel CP. H denotes an (N+L−1)×(N+L−1) squeezed sampling channel matrix, $H=[h_0, \ldots, h_k, \ldots, h_{N-1}]$. That is, H includes a channel coefficient vector (for example, CIR) $\dot{h}=[h_0, \ldots, h_k, \ldots, h_{L-1}]^T \in \mathbb{C}^L$ and a vector $h_k=[o_k \; h \; o_{N-k-1}]$. The channel coefficient vector h is sampled at a squeezed sampling time $\rho T_s$. $n_c$ denotes an (N+L−1)×1 additive Gaussian noise vector.

The channel CP remover 405 can receive the channel CP-added received signal block from the down converter 403 and can remove a channel CP from the received signal block. For example, as illustrated in FIG. 5, the channel CP remover 405 can remove the channel CP 505 from the received signal block 501 and can remove the channel CP 507 from the received signal block 503. The channel CP remover 405 can output the channel CP-removed received signal block to the FTN CP and CS adder 407.

For example, the channel CP remover 405 can generate a channel CP-removed received signal block using the following equation.

$$\begin{aligned}\bar{x} &= R_L x \qquad \text{[Equation 7]}\\ &= R_L(Ht' + n_c)\\ &= R_L HC_L t + R_L n_c\\ &= H_c t + n\end{aligned}$$

Here, $\bar{x}$ denotes a channel CP-removed received signal block. X denotes a received signal block $R_L$ denotes an N×(N+L−1) channel CP removing matrix, $R_L=[O_{N\times(L-1)} \; I_N]$. $H_c$ denotes an (N×N) circulant matrix for a squeezed sampling channel matrix H, $H_c=R_L HC_L$. n denotes an (N×1) additive Gaussian noise vector, $n=R_L n_c$.

The FTN CP and CS adder 407 can receive the channel CP-removed received signal block from the channel CP remover 405 and can add an FTN CP and CS to the received signal block to eliminate IBI caused by the Rx matched filter performing FTN. For example, as illustrated in FIG. 5, the FTN CP and CS adder 407 can add a CP 509 to the front of the received signal block 501 and can add a CS 511 to the rear of the received signal block 501. Further, the FTN CP and CS adder 407 can add a CP 513 to the front of the received signal block 503 and can add a CS 515 to the rear of the received signal block 503. The FTN CP and CS adder 407 can output the FTN CP and CS-added received signal block to the Rx matched filter 409.

For example, the length of each of the FTN CP and CS can be determined on the performance of the Rx matched filter 409, for example, the length of a tap of the Rx matched filter 409. For example, the length of each of the FTN CP and CS in the receiver 103 can be the same as the length of each of the FTN CP and CS in the transmitter 101. For another example, the length of each of the FTN CP and CS in the receiver 103 can be different from the length of each of the FTN CP and CS in the transmitter 101.

For example, the FTN CP and CS adder 407 can generate an FTN CP and CS-added received signal block using the following equation.

$$\bar{b} = C_M \bar{x} \qquad \text{[Equation 8]}$$

Here $\bar{b}$ denotes an FTN CP and CS-added received signal block and has an (N+2M)×1 size. $\bar{x}$ denotes a channel CP-removed received signal block. $C_M$ denotes an (N+2M)×N FTN CP and CS adding matrix. M denotes the length of each of an FTN CP and CS.

The Rx matched filter 409 can receive the FTN CP and CS-added received signal block from the FTN CP and CS adder 407, can filter the received signal block in a base band, and can apply FTN to the filtered received signal block. For example, the Rx matched filter 409 can be a squeezed sampling matched filter.

For example, applying FTN to a received signal block can mean receiving a received signal via sampling faster than the existing Nyquist rate. That is, when the Tx pulse shaping filter 205 in the transmitter transmits transmitted signals to overlap to be artificially non-orthogonal in terms of time so that the transmission is performed at an artificially faster symbol rate to break orthogonality between symbols, applying FTN to a received signal block can mean that received signals are received via sampling to be non-orthogonal in terms of time (faster than the Nyquist) so that sampling is performed in synchronization with the transmitter.

For example, as illustrated in FIG. 5, the Rx matched filter 409 can filter the FTN CP and CS-added received signal blocks 501 and 503 with a pulse-shaped filter for sampling, thereby generating the filtered received signal blocks 501 and 503 (indicated with diagonal lines). For example, the FTN CP 509 and CS 511 of the received signal block 501 can include IBI caused by the Rx matched filter 409 performing FTN. The FTN CP 513 and CS 515 of the received signal block 503 can include IBI caused by the Rx matched filter 409 performing FTN. The Rx matched filter 409 can output the FTN-applied received signal block to the FTN CP and CS remover 411.

For example, the Rx matched filter 409 can generate an FTN-applied received signal block using the following equation.

$$\bar{v} = G_r \bar{b} = G_r C_M \bar{x} \qquad [\text{Equation 9}]$$

Here, $\bar{v}$ denotes an FTN-applied received signal block and has an (N+2M)×1 size, $\bar{v}=[v_{-M}, \ldots, v_0, \ldots, v_k, \ldots, v_N, \ldots, v_{N+M-1}]^T$. $\bar{b}$ denotes an FTN CP and CS-added received signal block. $G_r$ denotes an (N+2M)×(N+2M) Toeplitz matrix for a squeezed sampling matched filter and includes a column vector $g^*_k$ of a finite coefficient vector $g^*=[g_{-M}, \ldots, g_0, \ldots, g_M]$. A matched filter coefficient generally has an attribute of a Hermite matrix of $g_l = g^*_l$.

The FTN CP and CS remover 411 can receive the FTN-applied received signal block from the Rx matched filter 409 and can remove the FTN CP and CS from the received signal block. For example, as illustrated in FIG. 5, the FTN CP and CS remover 411 can remove the FTN CP 509 and CS 511 from the received signal block 501 and can remove the FTN CP 513 and CS 515 from the received signal block 503. The FTN CP and CS remover 411 can output the FTN CP and CS-removed received signal block to the FFT unit 413.

For example, the FTN CP and CS remover 411 can generate an FTN CP and CS-removed received signal block using the following equation.

$$v = R_M \bar{v} = R_M G_r C_M \bar{x} = G_{rc} \bar{x} \qquad [\text{Equation 10}]$$

Here, v denotes an FTN CP and CS-removed received signal block and has an (N×1) size, $v=[v_0, \ldots, v_k, \ldots, v_{N-1}]^T$. $\bar{v}$ denotes an FTN-applied received signal block. $R_M$ denotes an N×(N+2M) FTN CP and CS removing matrix. $R_M G_r C_M = G_{rc}$.

To reconstruct data (d) transmitted from the transmitter 101, v can be derived as follows.

$$\begin{aligned} v &= G_{rc}(H_c t + n) \qquad [\text{Equation 11}] \\ &= G_{rc}(H_c G_{tc} d + n) \\ &= G_{rc} H_c G_{tc} d + \bar{n} \end{aligned}$$

Here, $\bar{n}$ denotes an (N×1) additive colored noise vector, and $\bar{n} = G_{rc} n$.

Equation 11 shows that frequency-domain equalization can be applied to an FTN CP and CS-removed received signal block v via a discrete Fourier transform (DFT or an FFT) and an inverse DFT (IDFT or an IFFT) using respective cyclic structures of circulant matrices $H_c$, $G_{rc}$, and $G_{tc}$.

Particularly, all circulant matrices share the same eigenvectors. That is, the same single DFT matrix supporting all circulant matrices can be applied to $G_{rc} H_c G_{tc}$ in Equation 11. Then, a circulant channel matrix $H_c$ can be diagonalized by a single DFT matrix F 2 CN into $H_c = F^H \Lambda_c F$. Here, $\Lambda_c$ is a diagonal matrix of the circulant channel matrix, which includes diagonal elements $[\lambda_{c,0}, \ldots, \lambda_{c,N-1}]$. Circulant sampling filter matrices $G_{rc}$ and $G_{tc}$ can be diagonalized into $G_{rc} = F^H \Lambda_{rc} F$ and $G_{tc} = F^H \Lambda_{tc} F$. Here, $\Lambda_{rc}$ and $\Lambda_{tc}$ are diagonal matrices of the circulant sampling filter matrices $G_{rc}$ and $G_{tc}$.

Therefore, $G_{rc} H_c G_{tc}$ can be represented by the following equation.

$$\begin{aligned} G_{rc} H_c G_{tc} &= F^H \Lambda_{rc} F F^H \Lambda_c F F^H \Lambda_{tc} F \qquad [\text{Equation 12}] \\ &= F^H \underbrace{\Lambda_{rc} \Lambda_c \Lambda_{tc}}_{\Lambda_a} F \end{aligned}$$

Here, $\Lambda_\alpha$ denotes all circulant matrices and can be represented by $\Lambda_\alpha = \Lambda_{rc} \Lambda_c \Lambda_{tc}$. A DFT matrix has a single attribute, for example, $F^H F = I_N$.

According to Equation 12, the receiver 103 converts a time-domain received signal block into a frequency-domain received signal block by applying a DFT matrix (or FFT matrix) F to the time-domain received signal block, performs frequency-domain equalization on the converted received signal block, and converts the equalized received signal block with an IDFT matrix (or IFFT matrix), thereby obtaining estimated data $\hat{d}$ of time-domain transmitted data d.

Based on this result, the FFT unit 413, the FDE 415, and the IFFT 417 can operate as follows.

The FFT unit 413 can perform an FFT algorithm on the time-domain received signal block to convert the received signal block from the time domain to the frequency domain and can output the converted received signal block to the FDE 415.

For example, the FFT unit 413 can generate a frequency-domain received signal block using the following equation.

$$\begin{aligned} Z_{ftnscfde} &= F G_{rc} v \qquad [\text{Equation 13}] \\ &= F G_{rc} (H_c t + n) \\ &= \underbrace{F G_{rc}}_{\text{receiver}} \underbrace{H_c}_{\text{channel}} \underbrace{G_{tc} d}_{\text{transmitter}} + \underbrace{F G_{rc} n}_{\text{noise}} \\ &= \Lambda_a F d + F G_{rc} n \\ &= \Lambda_a D + \underbrace{F G_{rc} n}_{n_f} \end{aligned}$$

Here, $Z_{ftnscfde}$ denotes a frequency-domain received signal block. The last term in Equation 13 can be derived from Fd=D and $F G_{rc} H_c G_{tc} F^H = F F^H \Lambda_\alpha F F^H = \Lambda_\alpha$.

The FDE 415 can receive the frequency-domain received signal block from the FFT unit 413, can equalize the received signal block in the frequency domain, and can output the equalized received signal block to the IFFT unit 417. Here, frequency-domain equalization refers to reducing amplitude or phase distortion to compensate for attenuation and propagation time delay deviation at each frequency in a transmission band.

For example, the FDE 415 can be a zero forcing (ZF) equalizer or minimum mean square error (MMSE) equalizer. For example, when the FDE 415 is a ZF equalizer, the frequency-domain received signal block $Z_{ftnscfde}$ can be equalized by multiplying $Z_{ftnscfde}$ by a weighting matrix of the ZF equalizer, $\Lambda_\alpha^\dagger = (\Lambda_\alpha^H \Lambda_\alpha)^{-1} \Lambda_\alpha^H$.

For example, the ZF equalizer can be based on a Moore-Penrose pseudoinverse $\Lambda_\alpha^\dagger$ of $\Lambda_\alpha$ for a pulse shaping filter, a matched filter, and a channel. In particular, when a channel $H_c$ is estimated to have no zero on frequencies corresponding to frequency-domain data, the weighting matrix of the ZF equalizer can be $\Lambda_\alpha^{-1}$. A ZF criterion of the ZF equalizer can allow external ISI of $Z_{ftnscfde}$ to be completely eliminated. However, when there is a large number of $H_c$ conditions (that is, when a coefficient of a channel impulse response is remarkably small due to serious channel attenuation caused by significant fading in a channel environment), elements of $\Lambda_\alpha^{-1} n_f$ have a great variation, and thus a noise term can be amplified.

For another example, when the FDE 415 is a linear MMSE equalizer, the linear MMSE equalizer can be applied such that an increase in noise and reduction in ISI can be properly balanced. The linear MMSE equalizer can calculate a minimum mean squared error (MSE) between D (or $d=F^H D$) and an estimate thereof $\hat{D}_{ftnscfde}=(W_{re})Z_{ftnscfde}$. Here, $\hat{D}_{ftnscfde}$ denotes frequency-domain estimated data, and $W_{re}$ denotes a weighting matrix for linear MMSE equalization.

Meanwhile, an MSE objective function (or a covariance matrix $R_{ee}$) can be represented by the following equation.

$$MSE = R_{ee} = E\{ee^H\} = E\{(\hat{D}-D)(\hat{D}-D)^H\} \quad \text{[Equation 14]}$$

$$e = \hat{D}_{ftnscfde} - D =$$
$$(W_{re})Z_{ftnscfde} - D = (W_{re}\Lambda_a - I_N)D + W_{re}n_f$$

Therefore, $$MSE = [(W_{re}\Lambda_a - I_N)R_D(W_{re}\Lambda_a - I_N)^H] + [W_{re}R_{n_f}W_{re}^H]$$

Here, $R_D=E\{DD^H\}$ and $R_{n_f}=E\{n_f n_f^H\}$.

By doing differentiation with respect to $W_{re}$, a weighting matrix $W_{re}$ for the linear MMSE equalizer can be acquired. $W_{re}$ is represented by the following equation.

$$W_{re}=R_D \Lambda_a^H (R_{n_f}+\Lambda_a R_D \Lambda_a^H)^{-1} \quad \text{[Equation 15]}$$

By applying $R_D=\sigma_d^2 I_N$ and $R_{n_f}=E\{FG_{rc}n(FG_{rc}n)^H\}=\Lambda_{rc}F^H E\{nn^H\}F\Lambda_{rc}^H=\sigma_n^2 \Lambda_{rc}\Lambda_{rc}^H$ to Equation 15, $W_{re}$ is represented by the following equation.

$$W_{re} = \sigma_d^2 \Lambda_a^H (\sigma_n^2 \Lambda_{rc}\Lambda_{rc}^H + \sigma_d^2 \Lambda_a \Lambda_a^H)^{-1} \quad \text{[Equation 16]}$$

$$= \Lambda_a^H \left(\frac{\sigma_n^2}{\sigma_d^2}\Lambda_{rc}\Lambda_{rc}^H + \Lambda_a \Lambda_a^H\right)^{-1}$$

For example, the linear MMSE equalizer can multiply the frequency-domain received signal block $Z_{ftnscfde}$ by the weighting matrix $W_{re}$, thereby generating an equalized received signal block $\hat{D}_{ftnscfde}$.

The IFFT unit 417 can receive the equalized received signal block from the FDE 415, can perform an IFFT algorithm to the received signal block to convert the received signal block from the frequency domain to the time domain, and can output the converted received signal block.

For example, the IFFT unit 417 can convert an equalized received signal block from the frequency domain into the time domain using the following equation.

$$\hat{d}_{ftnscfde} = F^H \hat{D}_{ftnscfde} = F^H (W_{re}) Z_{ftnscfde} \quad \text{[Equation 17]}$$
$$= \underbrace{F^H(W_{re})FG_{re}}_{receiver} \underbrace{H_c \; G_{tc} d}_{channel \; transmitter} + \underbrace{F^H(W_{re})FG_{rc}n}_{noise}$$
$$= F^H(W_{re})\Lambda_a F d + \underbrace{F^H(W_{re})\Lambda_{rc}Fn}_{noise}$$

Here, $d_{ftnscfde}$ denotes estimated data and can be expressed as follows from the viewpoint of the ZF/MMSE equalizers.

$$\hat{d}_{ftnscfde}^{ZF} = F^H + \Lambda_a^\dagger \Lambda_a F d + F^H \Lambda_a^\dagger \Lambda_{rc} F n \quad \text{[Equation 18]}$$
$$= d + F^H \Lambda_a^\dagger \Lambda_{rc} F n$$

$$\hat{d}_{ftnscfde}^{MMSE} = F^H \Lambda_a^H \left(\frac{\sigma_n^2}{\sigma_d^2}\Lambda_{rc}\Lambda_{rc}^H + \Lambda_a \Lambda_a^H\right)^{-1} \Lambda_a F d +$$
$$F^H \Lambda_a^H \left(\frac{\sigma_n^2}{\sigma_d^2}\Lambda_{rc}\Lambda_{rc}^H + \Lambda_a \Lambda_a^H\right)^{-1} \Lambda_{rc} F n$$

Here, $\Lambda_\alpha^\dagger \Lambda_\alpha = (\Lambda_\alpha \Lambda_\alpha^H)^{-1} \Lambda_\alpha^H \Lambda_\alpha = I_N$.

The controller 401 can control overall operations of the receiver 103. For example, the controller 401 can control the down converter 403, the channel CP remover 405, the FTN CP and CS adder 407, the Rx matched filter 409, the FTN CP and CS remover 411, the FFT unit 413, the FDE 415, and the IFFT unit 417.

For example, the controller 401 can down-convert a received signal block into a base band through the down converter 403. The controller 401 can remove a channel CP from the converted received signal block through the channel CP remover 405. The controller 401 can add an FTN CP and CS to the channel CP-removed received signal block through the FTN CP and CS adder 407. The controller 401 can filter the FTN CP and CS-added received signal block with a pulse-shaped filter for sampling according to FTN and can perform FTN through the Rx matched filter 409. Here, the FTN CP and CS of the FTN-applied received signal block can include IBI caused by the Rx matched filter 409 performing FTN.

The controller 401 can remove the FTN CP and CS from the FTN-applied received signal block through the FTN CP and CS remover 411. The controller 401 can convert the FTN CP and CS-removed received signal block from the time domain to the frequency domain through the FFT unit 413. The controller 401 can equalize the converted frequency-domain received signal block through the FDE 415. The controller 401 can convert the equalized received signal block from the frequency domain to the time domain through the IFFT unit 417. The controller 401 can decode the converted time-domain received signal block to reconstruct data.

Figure 6:
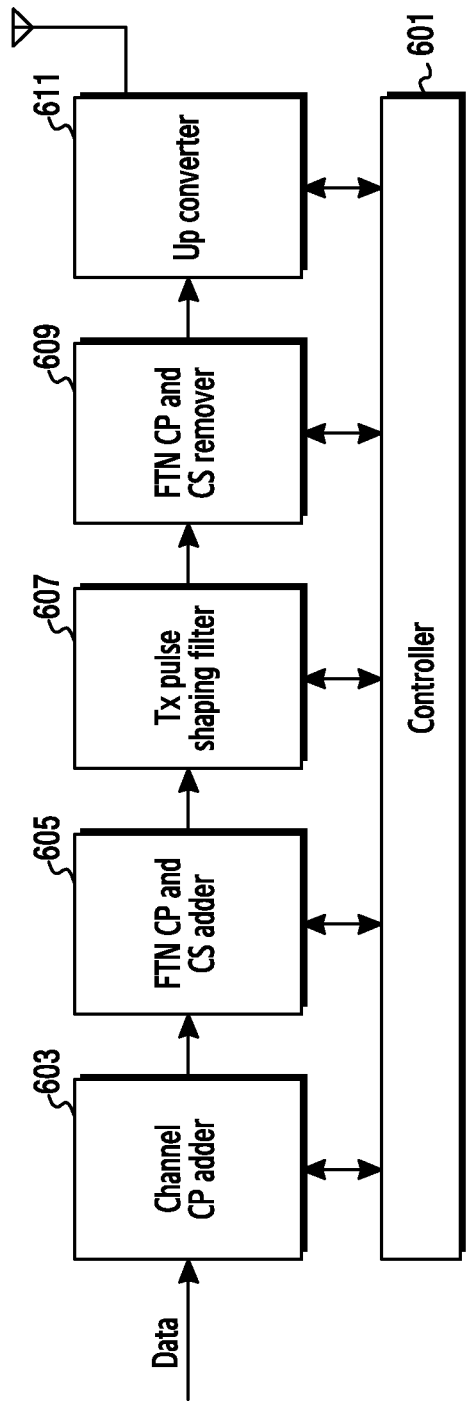
FIG. 6 is a block diagram of a transmitter according to a second exemplary embodiment of the present disclosure.

FIG. 6 is a block diagram of a transmitter according to a second exemplary embodiment of the present disclosure.

Referring to FIG. 6, a transmitter 101 can include a controller 601, a channel CP adder 603, an FTN CP and CS adder 605, a Tx pulse shaping filter 607, an FTN CP and CS remover 609, and an up converter 611.

Figure 7:
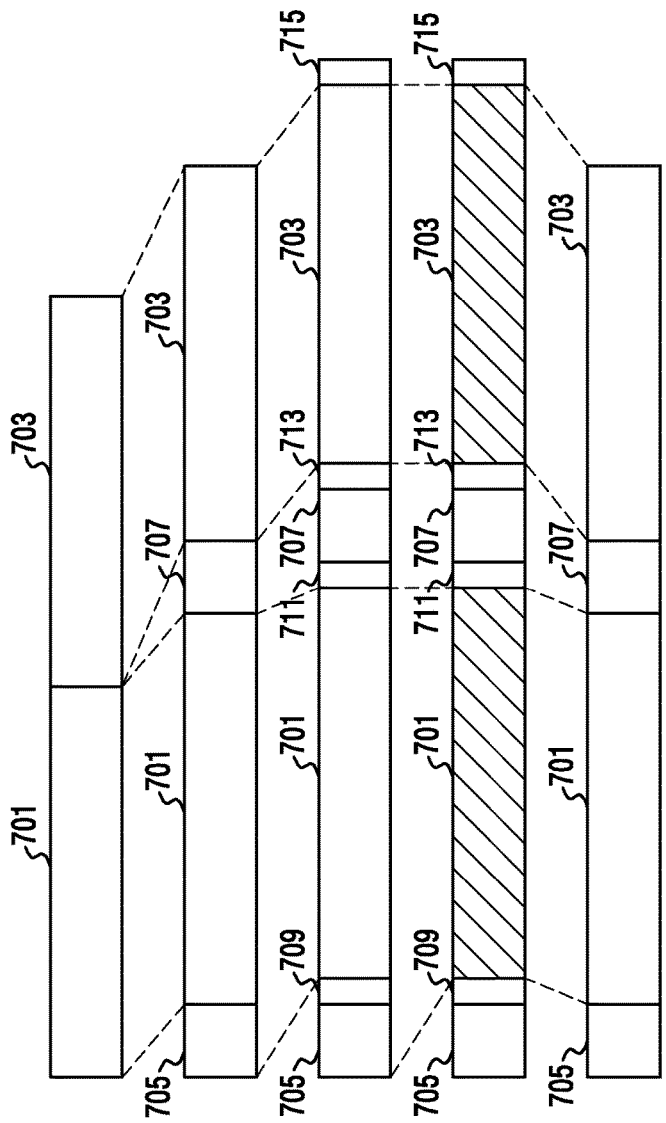
FIG. 7 illustrates a change process of a transmitted signal block in the transmitter according to the second exemplary embodiment of the present disclosure.

Describing each component, the channel CP adder 603 can receive a transmitted signal block and can add a channel CP to the transmitted signal block according to control by the controller 601. For example, as illustrated in FIG. 7, the channel CP adder 603 can receive successive transmitted signal blocks 701 and 703, can add a channel CP 705 to the transmitted signal block 701, and can add a channel CP 707 to the transmitted signal block 703. The channel CP adder 603 can output the channel CP-added transmitted signal block to the FTN CP and CS adder 605. For example, the channel CP can be a GI between transmitted blocks, and the length of the channel CP can be determined based on the length of a CIR.

The FTN CP and CS adder 605 can receive the channel CP-added transmitted signal block, can add an FTN CP and CS to the transmitted signal block, and can output the FTN CP and CS-added transmitted signal block to the Tx pulse shaping filter 607 according to control by the controller 601.

For example, as illustrated in FIG. 7, the FTN CP and CS adder 605 can add a CP 709 to the front of the transmitted signal block 701 and can add a CS 711 to the rear thereof. Further, the FTN CP and CS adder 605 can add a CP 713 to the front of the transmitted signal block 703 and can add a CS 715 to the rear thereof. For example, the lengths of the CPs and CSs can be determined on the performance of the Tx pulse shaping filter 607, for example, the length of a tap.

The Tx pulse shaping filter 607 can receive the FTN CP and CS-added transmitted signal block, can filter the transmitted signal block in a base band with a pulse-shaped filter for sampling according to FTN, and can apply FTN to the filtered transmitted signal block according to control by the controller 601. For example, as illustrated in FIG. 7, the Tx pulse shaping filter 607 can filter the FTN CP and CS-added transmitted signal blocks 701 and 703 with a pulse-shaped filter for sampling according to FTN, thereby generating the filtered transmitted signal blocks 701 and 703 (indicated with diagonal lines). For example, the FTN CP 709 and CS 711 of the transmitted signal block 701 can include IBI caused by the Tx pulse shaping filter 607 performing FTN. The FTN CP 713 and CS 715 of the transmitted signal block 703 can include IBI caused by the Tx pulse shaping filter 607 performing FTN. The Tx pulse shaping filter 607 can output the FTN-applied transmitted signal block to the FTN CP and CS remover 609.

The FTN CP and CS remover 609 can receive the FTN-applied transmitted signal block and can remove the FTN CP and CS from the received transmitted signal block according to control by the controller 601. For example, as illustrated in FIG. 7, the FTN CP and CS remover 609 can remove the FTN CP 709 and CS 711 from the transmitted signal block 701 filtered with the pulse-shaped filter for sampling according to FTN and can remove the FTN CP 713 and CS 715 from the transmitted signal block 703 filtered with the pulse-shaped filter for sampling according to FTN. The FTN CP and CS remover 609 can output the FTN CP and CS-removed transmitted signal block to the up converter 611.

The up converter 611 can receive the FTN CP and CS-removed transmitted signal block from the FTN CP and CS remover 609 and can modulate (for example, up-convert) the received transmitted signal block into an RF in order to transmit the transmitted signal block through the channel 105 according to control by the controller 601.

The controller 601 can control overall operations of the transmitter 101. For example, the controller 601 can control the channel CP adder 603, the FTN CP and CS adder 605, the Tx pulse shaping filter 607, the FTN CP and CS remover 609, and the up converter 611.

For example, the controller 601 can add a channel CP to a transmitted signal block through the channel CP adder 603. The controller 601 can add an FTN CP and CS to the channel CP-added transmitted signal block through the FTN CP and CS adder 605. The controller 601 can filter the FTN CP and CS-added transmitted signal block with a pulse-shaped filter for sampling according to FTN and can perform FTN through the Tx pulse shaping filter 607. Here, the FTN CP and CS of the FTN-applied transmitted signal block can include IBI caused by the Tx pulse shaping filter 607 performing FTN.

The controller 601 can remove the FTN CP and CS from the FTN-applied transmitted signal block through the FTN CP and CS remover 609. The controller 601 can up-convert the FTN CP and CS-removed transmitted signal block into an RF through the up converter 611 and can transmit the transmitted signal block through the channel 105.

Figure 8:
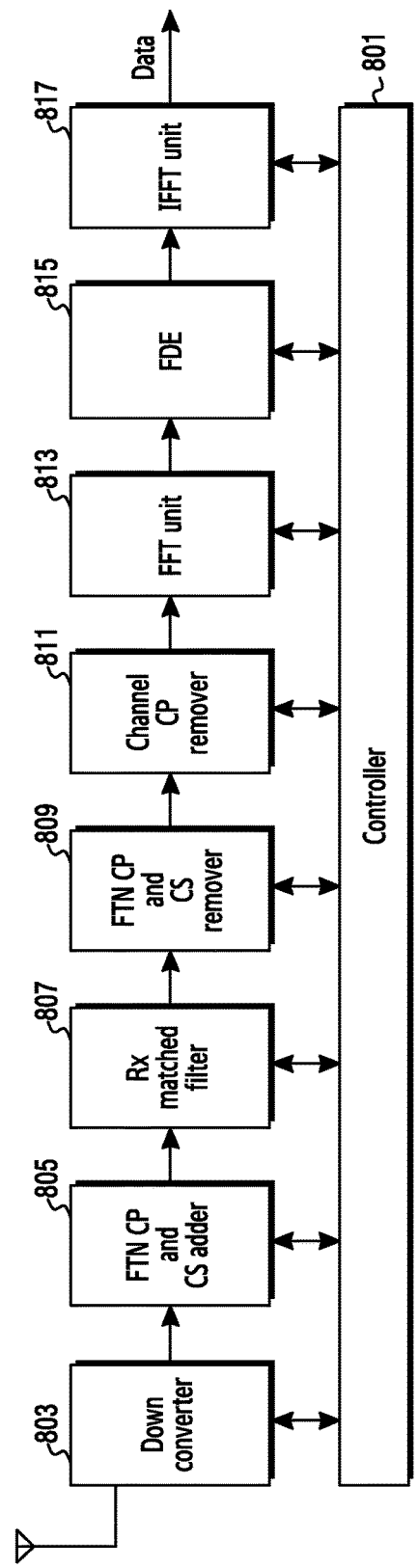
FIG. 8 is a block diagram of a receiver according to the second exemplary embodiment of the present disclosure.

FIG. 8 is a block diagram of a receiver according to the second exemplary embodiment of the present disclosure.

Referring to FIG. 8, a receiver 103 can include a controller 801, a down converter 803, an FTN CP and CS adder 805, an Rx matched filter 807, an FTN CP and CS remover 809, a channel CP remover 811, an FFT unit 813, an FDE 815, and an IFFT unit 817.

Figure 9:
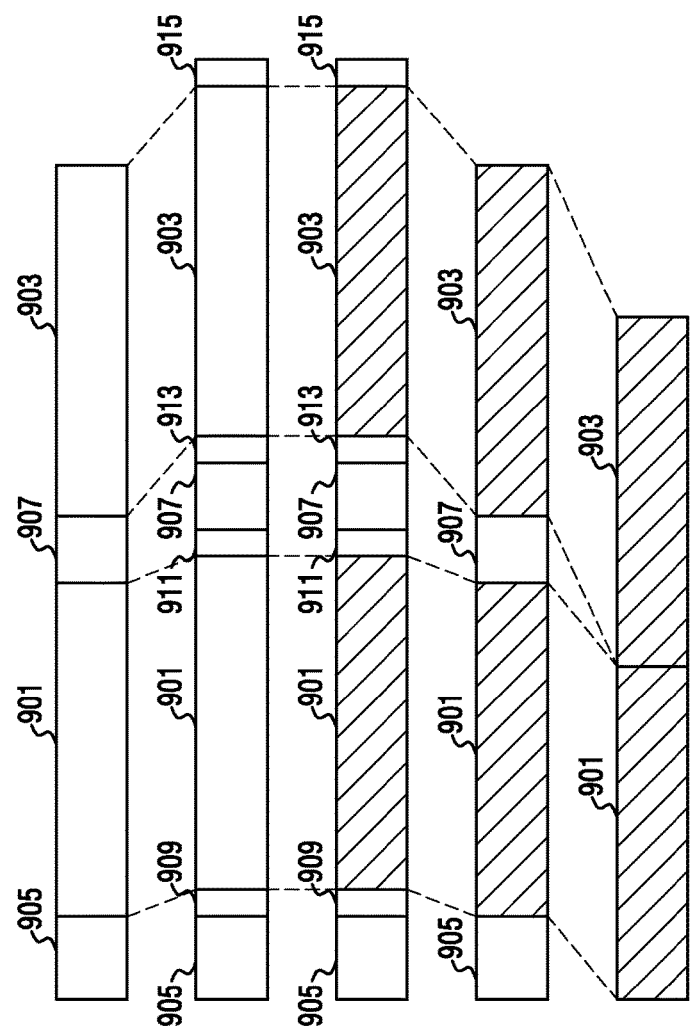
FIG. 9 illustrates a change process of a received signal block in the receiver according to the second exemplary embodiment of the present disclosure.

Describing each component, the down converter 803 can receive a received signal block via a receiving antenna and can down-convert the received signal block into a base band according to control by the controller 801. For example, as illustrated in FIG. 9, the down converter 803 can receive a received signal block 901 with a channel CP 905 added and a received signal block 903 with a channel CP 907 added.

The FTN CP and CS adder 805 can receive the received signal block from the down converter 803 and can add an FTN CP and CS to the received signal block to eliminate IBI caused by the Rx matched filter 807 performing FTN according to control by the controller 801. For example, as illustrated in FIG. 9, the FTN CP and CS adder 805 can add a CP 909 to the front of the received signal block 901 and can add a CS 911 to the rear of the received signal block 901. Further, the FTN CP and CS adder 805 can add a CP 913 to the front of the received signal block 903 and can add a CS 915 to the rear of the received signal block 903. The FTN CP and CS adder 805 can output the FTN CP and CS-added received signal block to the Rx matched filter 807.

For example, the length of each of the FTN CP and CS can be determined on the performance of the Rx matched filter 807, for example, the length of a tap of the Rx matched filter 807. For example, the length of each of the FTN CP and CS in the receiver 103 can be the same as the length of each of the FTN CP and CS in the transmitter 101. For another example, the length of each of the FTN CP and CS in the receiver 103 can be different from the length of each of the FTN CP and CS in the transmitter 101.

The Rx matched filter 807 can receive the FTN CP and CS-added received signal block from the FTN CP and CS adder 805, can filter the received signal block in a base band, and can apply FTN to the filtered received signal block according to control by the controller 801. For example, the Rx matched filter 807 can be a squeezed sampling matched filter.

For example, as illustrated in FIG. 9, the Rx matched filter 807 can filter the FTN CP and CS-added received signal blocks 901 and 903 with a pulse-shaped filter for sampling according to FTN, thereby generating the filtered received signal blocks 901 and 903 (indicated with diagonal lines). For example, the FTN CP 909 and CS 911 of the received signal block 901 can include IBI caused by the Rx matched filter 807 performing FTN. The FTN CP 913 and CS 915 of the received signal block 903 can include IBI caused by the Rx matched filter 807 performing FTN. The Rx matched filter 807 can output the FTN-applied received signal block to the FTN CP and CS remover 809.

The FTN CP and CS remover 809 can receive the FTN-applied received signal block from the Rx matched filter 807 and can remove the FTN CP and CS from the received signal block according to control by the controller 801. For example, as illustrated in FIG. 9, the FTN CP and CS remover 809 can remove the FTN CP 909 and CS 911 from the received signal block 901 and can remove the FTN CP 913 and CS 915 from the received signal block 903. The FTN CP and CS remover 809 can output the FTN CP and CS-removed received signal block to the channel CP remover 811.

The channel CP remover 811 can receive the FTN CP and CS-removed received signal block from the FTN CP and CS remover 809 and can remove a channel CP from the received signal block according to control by the controller 801. For example, as illustrated in FIG. 9, the channel CP remover 811 can remove the channel CP 905 from the received signal block 901 and can remove the channel CP 907 from the received signal block 903. The channel CP remover 811 can output the channel CP-removed received signal block to the FFT unit 813.

The FFT unit 813 can perform an FFT algorithm on the time-domain received signal block to convert the received signal block from the time domain in the frequency domain and can output the converted received signal block to the FDE 815 according to control by the controller 801.

The FDE 815 can receive the frequency-domain received signal block from the FFT unit 813, can equalize the received signal block in the frequency domain, and can output the equalized received signal block to the IFFT unit 817 according to control by the controller 801. The IFFT unit 817 can receive the equalized received signal block from the FDE 815, can perform an IFFT algorithm to the received signal block to convert the received signal block from the frequency domain to the time domain, and can output the converted received signal block according to control by the controller 801.

The controller 801 can control overall operations of the receiver 103. For example, the controller 801 can control the down converter 803, the FTN CP and CS adder 805, the Rx matched filter 807, the FTN CP and CS remover 809, the channel CP remover 811, the FFT unit 813, the FDE 815, and the IFFT unit 817.

For example, the controller 801 can down-convert a received signal block into a base band through the down converter 803. The controller 801 can add an FTN CP and CS to the converted received signal block through the FTN CP and CS adder 805. The controller 801 can filter the FTN CP and CS-added received signal block with a pulse-shaped filter for sampling according to FTN and can perform FTN through the Rx matched filter 807. Here, the FTN CP and CS of the FTN-applied received signal block can include IBI caused by the Rx matched filter 807 performing FTN.

The controller 801 can remove the FTN CP and CS from the FTN-applied received signal block through the FTN CP and CS remover 809. The controller 801 can remove a channel CP from the received signal block through the channel CP remover 811. The controller 801 can convert the channel CP-removed received signal block from the time domain into the frequency domain through the FFT unit 813. The controller 801 can equalize the converted frequency-domain received signal block through the FDE 815. The controller 801 can convert the equalized received signal block from the frequency domain into the time domain through the IFFT unit 817. The controller 801 can decode the converted time-domain received signal block to reconstruct data.

The transmitter 101 illustrated in FIG. 2 transmits data using FTN signaling, and the receiver 103 illustrated in FIG. 4 equalizes data using an FDE. A single carrier (SC) transmission scheme using FTN signaling and an FDE is referred to as an FTN-SC-FDE transmission scheme.

The transmitter 101 illustrated in FIG. 6 and the receiver 103 illustrated in FIG. 8 are similar in structure to the transmitter 101 illustrated in FIG. 2 and the receiver 103 illustrated in FIG. 4 and thus are construed as following the FTN-SC-FDE transmission scheme.

Figure 10:
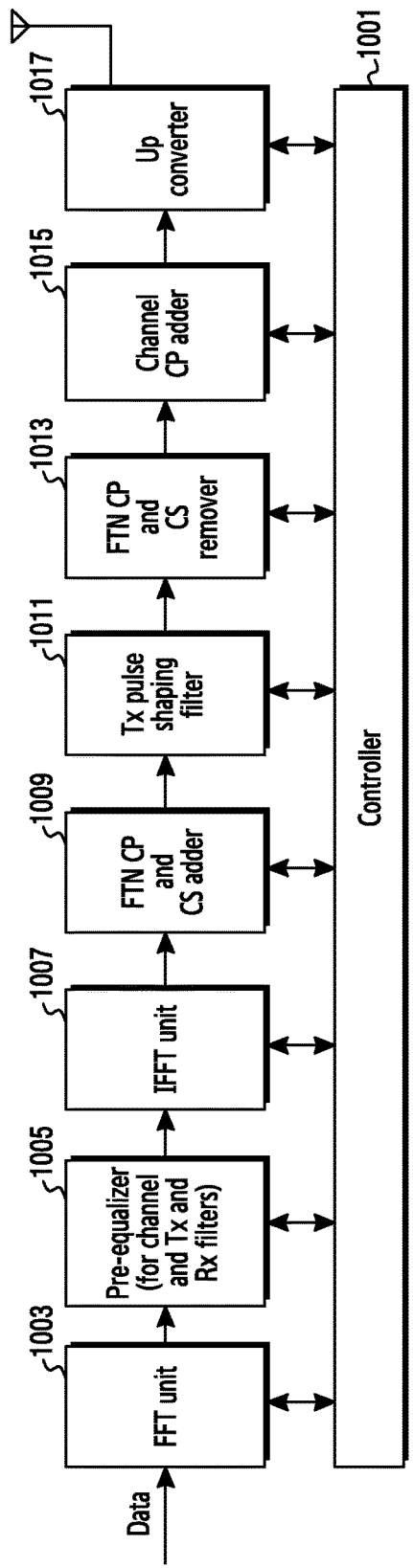
FIG. 10 is a block diagram of a transmitter according to a third exemplary embodiment of the present disclosure.

FIG. 10 is a block diagram of a transmitter according to a third exemplary embodiment of the present disclosure.

Referring to FIG. 10, a transmitter 101 can include a controller 1001, an FFT unit 1003, a pre-equalizer 1005, an IFFT unit 1007, an FTN CP and CS adder 1009, a Tx pulse shaping filter 1011, an FTN CP and CS remover 1013, a channel CP adder 1015, and an up converter 1017.

Comparing with the transmitter 101 of FIG. 2, the transmitter 101 of FIG. 10 further includes the FFT unit 1003, the pre-equalizer (pre-FDE) 1005, and the IFFT unit 1007 in addition to the structure of the transmitter 101 of FIG. 2. Thus, hereinafter, the FFT unit 1003, the pre-equalizer 1005, and the IFFT unit 1007 are described in detail, while the description of the other components (the FTN CP and CS adder 1009, the Tx pulse shaping filter 1011, the FTN CP and CS remover 1013, the channel CP adder 1015, and the up converter 1017) is omitted.

The FFT unit 1003, the pre-FDE 1005, and the IFFT unit 1007 are components for the transmitter 101 to perform pre-equalization (PE). Here, PE is for reducing the computational complexity of the receiver 103 as the transmitter 101 performs frequency-domain equalization, which the receiver 103 is used to perform. In particular, PE can simplify the structure of the receiver 103 in a down link. For example, the receiver 103 can be configured excluding an FDE. To perform PE, the transmitter 101 needs to know channel state information (CSI). For example, the transmitter 101 can be fed CSI back by the receiver 103.

Here, a power scaling factor denotes a power scaling factor for controlling the transmission power of PE for the Tx pulse shaping filter 1011 of the transmitter 101, the channel, and the Rx matched filter of the receiver 103.

Describing each component, the FFT unit 1003 can receive a time-domain transmitted signal block, can perform an FFT algorithm on the transmitted signal block to convert the transmitted signal block from the time domain into the frequency domain, and can output the converted transmitted signal block to the pre-FDE 1005.

For example, the FFT unit 1003 can generate a converted frequency-domain transmitted signal block using the following equation.

$$\begin{aligned} Z_{pe\text{-}ftnscfde} &= A_{pe}^{-1} F G_{rc} v \\ &= \underbrace{A_{pe}^{-1} F G_{rc}}_{receiver} \underbrace{H_c}_{channel} \underbrace{G_{tc} F^H (P_{pe}) Fd}_{transmitter} + \underbrace{A_{pe}^{-1} F G_{rc} n}_{noise} \\ &= \underbrace{\Lambda_a (W_{pe}) Fd + A_{pe}^{-1} F G_{rc} n}_{n_f} \end{aligned}$$ [Equation 19]

Here, $Z_{pe\text{-}ftnscfde}$ denotes a converted frequency-domain transmitted signal block $A_{pe}^{-1}$ denotes the inverse function of $A_{pe}$. $P_{pe}$ denotes a weighting matrix for PE, $P_{pe} = A_{pe}^{-1} = W_{pe}$. Here, $W_{pe}$ denotes a weighting matrix of $P_{pe}$. $A_{pe}$ denotes a power scaling factor used to control the transmission power of PE for the pulse shaping filter of the transmitter 101, the matched filter of the receiver 103, and the channel 105. The last term in Equation 19 is derived from $FG_{rc}H_cG_{tc}F^H = \Lambda_a = \Lambda_{rc}\Lambda_c\Lambda_{tc}$.

For example, the transmitter 101 can receive the inverse function $A_{pe}^{-1}$ of the power scaling factor from the receiver 103 and can compensate for a current power scaling factor based on the received inverse function of the power scaling factor.

The pre-FDE 1005 can receive the frequency-domain transmitted signal block from the FFT unit 1003, can pre-equalize the transmitted signal block in the frequency domain, and can output the pre-equalized transmitted signal block to the IFFT unit 1007.

For example, the pre-FDE 1005 can be a ZF equalizer or linear MMSE equalizer. If the pre-FDE 1005 is a linear MMSE equalizer, an MSE of the linear MMSE equalizer can be represented by the following equation.

$$MSE = [(\Lambda_\alpha W_{pe} - I_N) R_D (\Lambda_\alpha W_{pe} - I_N)^H] + [R_{n_f}] \quad \text{[Equation 20]}$$

Equation 20 is derived from and $\hat{D}_{pe\text{-}ftnscfde} = Z_{pe\text{-}ftnscfde}$ and $e = \hat{D}_{pe\text{-}ftnscfde} - D = (\Lambda_\alpha W_{pe} - I_N) D + n_f$.

By performing differentiation with respect to $W_{pe}$, $W_{pe}$ can be acquired.

$$W_{pe} = (\Lambda_\alpha^H \Lambda_\alpha)^{-1} \Lambda_\alpha^H \quad \text{[Equation 21]}$$

In addition, the power scaling factor $A_{pe}$ can be required such that pre-equalized average transmission power is not greater than non-pre-equalized average transmission power. For example, when $E\{|A_{pe} W_{pe} d|^2\} = E\{|d|^2\}$, $A_{pe}$ can be represented by the following equation.

$$A_{pe} = \sqrt{\frac{N}{tr\{W_{pe} W_{pe}^H\}}} = \sqrt{\frac{N}{tr\{(\Lambda_\alpha^H \Lambda_\alpha)^{-1}\}}} \quad \text{[Equation 22]}$$

Here, $A_{pe}$ denotes a power scaling factor for PE.

The IFFT unit 1007 can receive the pre-equalized transmitted signal block from the pre-FDE 1005, can perform an IFFT algorithm to the transmitted signal block to convert the transmitted signal block from the frequency domain to the time domain, and can output the converted transmitted signal block to the FTN CP and CS adder 1009.

For example, the IFFT unit 1007 can convert a pre-equalized transmitted signal block from the frequency domain to the time domain using the following equation.

$$\begin{aligned}\hat{d}_{pe\text{-}ftnscfde} &= F^H Z_{pe\text{-}ftnscfde} \\ &= F^H \Lambda_\alpha (W_{pe}) Fd + A_{pe}^{-1} F^H F G_{rc} n \\ &= d + A_{pe}^{-1} F^H \Lambda_{rc} Fn\end{aligned} \quad \text{[Equation 23]}$$

Here, $\hat{d}_{pe\text{-}ftnscfde}$ denotes time-domain estimated data (for example, a transmitted signal block). The last term in Equation 23 is derived from $G_{rc} = F^H \Lambda_{rc} F$.

The controller 1001 can control overall operations of the transmitter 101. For example, the controller 1001 can control the FFT unit 1003, the pre-FDE 1005, the IFFT unit 1007, the FTN CP and CS adder 1009, the Tx pulse shaping filter 1011, the FTN CP and CS remover 1013, the channel CP adder 1015, and the up converter 1017. For example, the controller 1001 can pre-equalize a transmitted signal block through the FFT unit 1003, the pre-FDE 1005, and the IFFT unit 1007. Here, pre-equalizing refers to equalization performed in advance by the transmitter 101 in view of loss (for example, signal power loss or the like) caused by the Tx pulse shaping filter 1011 of the transmitter 101, the matched filter of the receiver 103, and the channel 105.

The controller 1001 can add an FTN CP and CS to the transmitted signal block through the FTN CP and CS adder 1009. The controller 1001 can filter the FTN CP and CS-added transmitted signal block and can perform FTN through the Tx pulse shaping filter 1011. Here, the FTN CP and CS of the FTN-applied transmitted signal block can include IBI caused by the Tx pulse shaping filter 1011 performing FTN. The controller 1001 can remove the FTN CP and CS from the FTN-applied transmitted signal block through the FIN CP and CS remover 1013.

The controller 1001 can add a channel CP to the FTN CP and CS-removed transmitted signal block through the channel CP adder 1015. The controller 1001 can up-convert the channel CP-added transmitted signal block into an RF through the up converter 1017 and can transmit the transmitted signal block to the receiver 103 through the channel 105.

Figure 11:
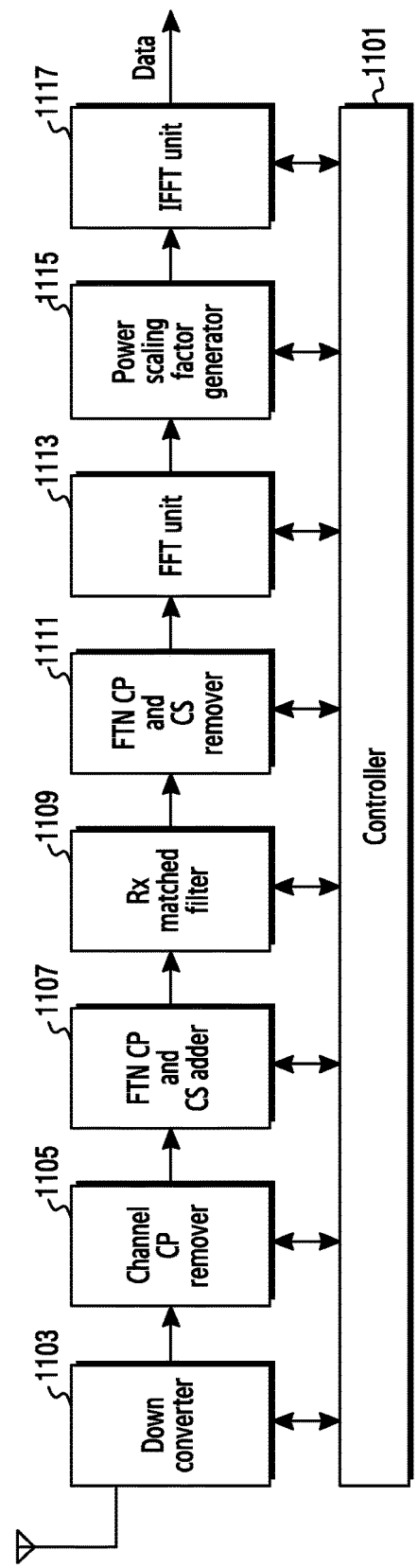
FIG. 11 is a block diagram of a receiver according to the third exemplary embodiment of the present disclosure.

FIG. 11 is a block diagram of a receiver according to the third exemplary embodiment of the present disclosure.

Referring to FIG. 11, a receiver 103 can include a controller 1101, a down converter 1103, a channel CP remover 1105, an FTN CP and CS adder 1107, an Rx matched filter 1109, an FTN CP and CS remover 1111, an FFT unit 1113, a power scaling factor generator 1115, and an IFFT unit 1117.

The receiver 103 illustrated in FIG. 11 is a receiver corresponding to the transmitter 101 of FIG. 10. Comparing with the receiver 103 of FIG. 4, the receiver 103 of FIG. 11 has the same structure as the receiver 103 of FIG. 4 except that the power scaling factor generator 1115 is included instead of an FDE. Thus, hereinafter, the description of the components (the down converter 1103, the channel CP remover 1105, the FTN CP and CS adder 1107, the Rx matched filter 1109, the FTN CP and CS remover 1111, the FFT unit 1113, and the IFFT unit 1117) other than the power scaling factor generator 1115 is omitted.

Describing each component, the power scaling factor generator 1115 can receive a frequency-domain received signal block from the FFT unit 1113, can determine a power scaling factor (for example, $A_{pe}^{-1}$) for PE from the received signal block, and can compensate for the signal size of the received signal block based on the determined power scaling factor. For example, the power scaling factor generator 1115 can determine the inverse function of the power scaling factor using pure scaling or automatic gain control (AGC).

The controller 1101 can control overall operations of the receiver 103. For example, the controller 1101 can control the down converter 1103, the channel CP remover 1105, the FTN CP and CS adder 1107, the Rx matched filter 1109, the FTN CP and CS remover 1111, the FFT unit 1113, the power scaling factor generator 1115, and the IFFT unit 1117.

For example, the controller 1101 can down-convert a received signal block into a base band through the down converter 1103. The controller 1101 can remove a channel CP from the converted received signal block through the channel CP remover 1105. The controller 1101 can add an FTN CP and CS to the channel CP-removed received signal block through the FTN CP and CS adder 1107. The controller 1101 can filter the FTN CP and CS-added received signal block with a pulse-shaped filter for sampling according to FTN and can perform FTN through the Rx matched filter 1109. Here, the FTN CP and CS of the FTN-applied received signal block can include IBI caused by the Rx matched filter 1109 performing FTN.

The controller 1101 can remove the FTN CP and CS from the FTN-applied received signal block through FTN CP and CS remover 1111. The controller 1101 can convert the FTN CP and CS-removed received signal block from the time domain to the frequency domain through the FFT unit 1113. The controller 1101 can generate a power scaling factor for PE from the frequency-domain received signal block and can compensate for the signal size of the received signal block based on the generated power scaling factor through the power scaling factor generator 1115. The controller 1101 can convert the received signal block from the frequency domain to the time domain through the IFFT unit 1117. The controller 1101 can decode the converted time-domain received signal block to reconstruct data.

In one exemplary embodiment, the controller 1101 can generate CSI and can feed the generated CSI back to the transmitter 101. For example, the controller 1101 can feed back the CSI along with power scaling factor related information.

The transmitter 101 of FIG. 10 generates a transmitted signal block by performing PE and transmits the generated transmitted signal block using FTN signaling. The receiver 103 of FIG. 11 receives a PE-applied received signal block and reconstructs data from the received signal block. The transmission scheme applied to the transmitter 101 of FIG. 10 and the receiver 103 of FIG. 11 can be referred to as PE-FTN-SC-FDE.

Figure 12:
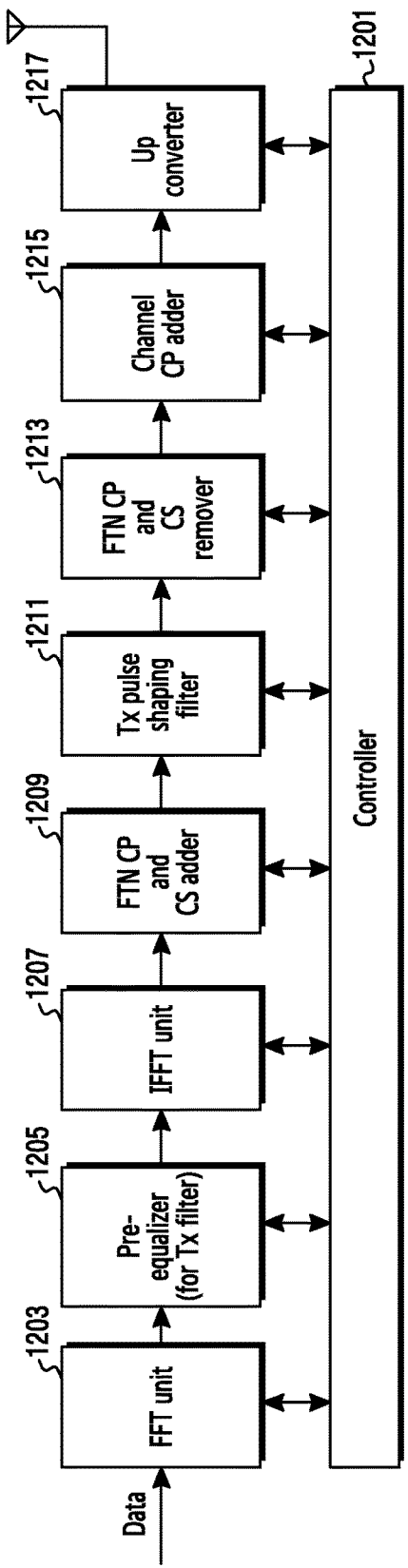
FIG. 12 is a block diagram of a transmitter according to a fourth exemplary embodiment of the present disclosure.

FIG. 12 is a block diagram of a transmitter according to a fourth exemplary embodiment of the present disclosure.

Referring to FIG. 12, a transmitter 101 can include a controller 1201, an FFT unit 1203, a pre-equalizer 1205, an IFFT unit 1207, an FTN CP and CS adder 1209, a Tx pulse shaping filter 1211, an FTN CP and CS remover 1213, a channel CP adder 1215, and an up converter 1217.

Comparing with the transmitter 101 of FIG. 10, the transmitter 101 of FIG. 12 includes the pre-FDE 1205 of FIG. 12, instead of the pre-FDE 1005 of FIG. 10. Thus, hereinafter, the pre-FDE 1205 is described in detail, while the description of the other components (the FFT unit 1203, the IFFT unit 1207, the FTN CP and CS adder 1209, the Tx pulse shaping filter 1211, the FTN CP and CS remover 1213, the channel CP adder 1215, and the up converter 1217) is omitted.

Describing each component, the pre-FDE 1205 can receive a frequency-domain transmitted signal block from the FFT unit 1203, can perform Pre-equalization for an Only Pulse shaping filter (POP) on the transmitted signal block with respect to the Tx pulse shaping filter 1211 of the transmitter 101, and can output the pre-equalized transmitted signal block to the IFFT unit 1207.

A weighting matrix $P_{pop}$ for POP can be represented by the following equation.

$$P_{pop} = A_{pop}(\Lambda_{tc}^H \Lambda_{tc})^{-1} \Lambda_{tc}^H \quad \text{[Equation 24]}$$

Here, $P_{pop}$ denotes a weighting matrix for POP, and $A_{pop} = \sqrt{N/\text{tr}\{(\Lambda_{tc}^H \Lambda_{tc})^{-1}\}}$ can denote a power scaling factor required to pre-equalize ISI caused by the Tx pulse shaping filter 1211.

The controller 1201 can control overall operations of the transmitter 101. For example, the controller 1201 can control the FFT unit 1203, the pre-FDE 1205, the IFFT unit 1207, the FTN CP and CS adder 1209, the Tx pulse shaping filter 1211, the FTN CP and CS remover 1213, the channel CP adder 1215, and the up converter 1217.

For example, the controller 1201 can pre-equalize a transmitted signal block through the FFT unit 1203, the pre-FDE 1205, and the IFFT unit 1207 to eliminate ISI caused by the Tx pulse shaping filter 1211.

The controller 1201 can add an FTN CP and CS to the transmitted signal block through the FTN CP and CS adder 1209. The controller 1201 can filter the FTN CP and CS-added transmitted signal block with a pulse-shaped filter for sampling according to FTN and can perform FTN through the Tx pulse shaping filter 1211. Here, the FTN CP and CS of the FTN-applied transmitted signal block can include IBI caused by the Tx pulse shaping filter 1211 performing FTN. The controller 1201 can remove the FTN CP and CS from the FTN-applied transmitted signal block through the FIN CP and CS remover 1213.

The controller 1201 can add a channel CP to the FTN CP and CS-removed transmitted signal block through the channel CP adder 1215. The controller 1201 can up-convert the channel CP-added transmitted signal block into an RF through the up converter 1217 and can transmit the transmitted signal block to the receiver 103 through the channel 105.

Figure 13:
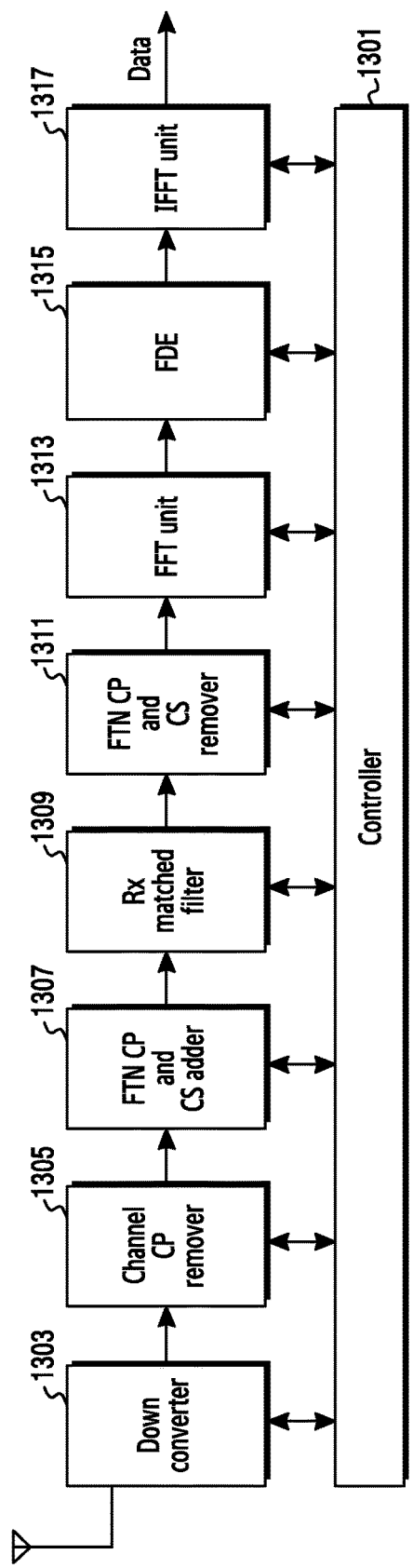
FIG. 13 is a block diagram of a receiver according to the fourth exemplary embodiment of the present disclosure.

FIG. 13 is a block diagram of a receiver according to the fourth exemplary embodiment of the present disclosure.

Referring to FIG. 13, a receiver 103 can include a controller 1301, a down converter 1303, a channel CP remover 1305, an FTN CP and CS adder 1307, an Rx matched filter 1309, an FTN CP and CS remover 1311, an FFT unit 1313, a FDE 1315, and an IFFT unit 1317.

The receiver 103 illustrated in FIG. 13 is a receiver corresponding to the transmitter 101 of FIG. 12. Comparing with the receiver 103 of FIG. 11, the receiver 103 of FIG. 13 has the same structure as the receiver 103 of FIG. 11 except that an FDE 1315 is included instead of the power scaling factor generator 1115 of FIG. 11. Thus, hereinafter, the description of the components (the down converter 1303, the channel CP remover 1305, the FTN CP and CS adder 1307, the Rx matched filter 1309, the FTN CP and CS remover 1311, the FFT unit 1313, and the IFFT unit 1317) other than the FDE 1315 is omitted.

Describing each component, the FDE 1315 can receive a time-domain received signal block from the FFT unit 1313 and can equalize the received signal block in view of loss (for example, signal power loss, ISI or IBI) caused by the channel 105 and the Rx matched filter 1309 of the receiver 103. The FDE 1315 can transmit the equalized received signal block to the IFFT unit 1317.

For example, the time-domain received signal block received from the FFT unit 1313 can be represented by the following equation.

$$\begin{aligned} Z_{pop-ftnscfde} &= A_{pop}^{-1} F G_{rc} v \quad \text{[Equation 25]} \\ &= \underbrace{A_{pop}^{-1} F G_{rc}}_{receiver} \underbrace{H_c}_{channel} \underbrace{G_{tc} F^H (P_{pop}) F d}_{transmitter} + \\ &\quad \underbrace{A_{pop}^{-1} F G_{rc} n}_{noise} \\ &= A_{pop}^{-1} \Lambda_{\alpha} \underbrace{A_{pop}\{(\Lambda_{tc}^H \Lambda_{tc})^{-1} \Lambda_{tc}^H\}}_{P_{pop}} F d + \\ &\quad A_{pop}^{-1} F G_{rc} n \\ &= \underbrace{\Lambda_{rc} \Lambda_c}_{\Lambda_{rx}} F d + A_{pop}^{-1} F G_{rc} n = \Lambda_{rx} F d + \\ &\quad \underbrace{A_{pop}^{-1} F G_{rc} n}_{n_f} \end{aligned}$$

Here, $Z_{pop-ftnscfde}$ denotes a frequency-domain received signal block, which is pre-equalized in view of ISI caused by the Tx pulse shaping filter 1211 of the transmitter 101. $A_{pop}^{-1}$ denotes the inverse function of $A_{pop}$. The last term in Equation 25 is derived from $FG_{rc}H_cG_{tc}F^H = \Lambda_{\alpha}$ and $\Lambda_{\alpha}(\Lambda_{tc}^H \Lambda_{tc})^{-1} \Lambda_{tc}^H = \Lambda_{rc}\Lambda_c\Lambda_{tc}(\Lambda_{tc}^H \Lambda_{tc})^{-1} \Lambda_{tc}^H = \Lambda_{rc}\Lambda_c = \Lambda_{rx}$.

For example, the FDE 1315 can equalize the frequency-domain received signal block using the following equation.

$$\hat{D}_{pop\text{-}fmscfde} = (W_{pop})Z_{pop\text{-}fmscfde} \quad \text{[Equation 26]}$$

$$e = \hat{D}_{pop\text{-}fmscfde} - D = W_{pop}Z_{pop\text{-}fmscfde} - D$$
$$= (W_{pop}\Lambda_{rx} - I_N)D + W_{pop}n_f$$

Here, $\hat{D}_{pop\text{-}fmscfde}$ denotes equalized estimated data (for example, a received signal block), and $Z_{pop\text{-}fmscfde}$ denotes a frequency-domain received signal block. $W_{pop}$ denotes a weighting matrix for eliminating ISI caused by the channel 105 and the Rx matched filter 1309.

If the FDE 1315 is a linear MMSE equalizer, an MSE of the linear MMSE equalizer can be represented as follows.

$$\text{MSE} = [(W_{pop}\Lambda_{rx} - I_N)R_D(W_{pop}\Lambda_{rx} - I_N)^H] + [W_{pop}R_{n_f}W_{pop}^H] \quad \text{[Equation 27]}$$

By differentiating the MSE with respect to $W_{pop}$, a weighting matrix $W_{pop}$ is acquired in terms of an MMSE criterion. $W_{pop}$ can be represented by the following equation.

$$W_{pop} = R_D \Lambda_{rx}^H (R_{n_f} + \Lambda_{rx} R_D \Lambda_{rx}^H)^{-1} \quad \text{[Equation 28]}$$
$$= \sigma_d^2 \Lambda_{rx}^H (A_{pop}^{-2} \sigma_n^2 \Lambda_{rc} \Lambda_{rc}^H + \sigma_d^2 \Lambda_{rx} \Lambda_{rx}^H)^{-1}$$
$$= \Lambda_{rx}^H \left( A_{pop}^{-2} \frac{\sigma_n^2}{\sigma_d^2} \Lambda_{rc} \Lambda_{rc}^H + \Lambda_{rx} \Lambda_{rx}^H \right)^{-1}$$

Here, $R_{n_f} = A_{pop}^{-2} E\{FG_{rc}n(FG_{rc}n)^H\} = A_{pop}^{-2} \sigma_n^2 \Lambda_{rc} \Lambda_{rc}^H$.

If the FDE 1315 is a ZF equalizer, $W_{pop}$ can be represented by the following equation.

$$W_{pop} = \Lambda_{rx}^\dagger = (\Lambda_{rx}^H \Lambda_{rx})^{-1} \Lambda_{rx}^H \quad \text{[Equation 29]}$$

The IFFT unit 1317 can receive the equalized received signal block and can convert the received signal block from the frequency domain to the time domain. For example, the IFFT unit 1317 can convert the equalized received signal block to the time domain using the following equation.

$$\hat{d}_{pop\text{-}fmscfde} = F^H (W_{pop}) Z_{pop\text{-}fmscfde} \quad \text{[Equation 30]}$$
$$= F^H (W_{pop}) \Lambda_{rx} Fd + A_{pop}^{-1} F^H (W_{pop}) \Lambda_{rc} Fn$$

Here, $\hat{d}_{pop\text{-}fmscfde}$ denotes time-domain estimated data (for example, a received signal block). The last term in Equation 30 is derived from $G_{rc} = F^H \Lambda_{rc} F$.

Here, $\hat{d}_{pop\text{-}fmscfde}$ denotes time-domain estimated data (for example, a received signal block). The last term in Equation 30 is derived from $G_{rc} = F^H \Lambda_{rc} F$.

$$\hat{d}_{pop\text{-}fmscfde}^{ZF} = F^H \Lambda_{rx}^\dagger \Lambda_{rx} Fd + A_{pop}^{-1} F^H \Lambda_{rx}^\dagger \Lambda_{rc} Fn \quad \text{[Equation 31]}$$
$$= d + A_{pop}^{-1} F^H \Lambda_{rx}^\dagger \Lambda_{rc} Fn$$

$$\hat{d}_{pop\text{-}fmscfde}^{MMSE} = F^H \Lambda_{rx}^H \left( A_{pop}^{-2} \frac{\sigma_n^2}{\sigma_d^2} \Lambda_{rc} \Lambda_{rc}^H + \Lambda_{rx} \Lambda_{rx}^H \right)^{-1} \Lambda_{rx} Fd +$$
$$A_{pop}^{-1} F^H \Lambda_{rx}^H \left( A_{pop}^{-2} \frac{\sigma_n^2}{\sigma_d^2} \Lambda_{rc} \Lambda_{rc}^H + \Lambda_{rx} \Lambda_{rx}^H \right)^{-1} \Lambda_{rc} Fn$$

Here, $\Lambda_{rx}^\dagger \Lambda_{rx} = \Lambda_{rx}^H (\Lambda_{rx} \Lambda_{rx}^H)^{-1} \Lambda_{rx} = I_N$.

The controller 1301 can control overall operations of the receiver 103. For example, the controller 1301 can control the down converter 1303, the channel CP remover 1305, the FTN CP and CS adder 1307, the Rx matched filter 1309, the FTN CP and CS remover 1311, the FFT unit 1313, the FDE 1315, and the IFFT unit 1317.

For example, the controller 1301 can down-convert a received signal block into a base band through the down converter 1303. The controller 1301 can remove a channel CP from the converted received signal block through the channel CP remover 1305. The controller 1301 can add an FTN CP and CS to the channel CP-removed received signal block through the FTN CP and CS adder 1307. The controller 1301 can filter the FTN CP and CS-added received signal block with a pulse-shaped filter for sampling according to FTN and can perform FTN through the Rx matched filter 1309. Here, the FTN CP and CS of the FTN-applied received signal block can include IBI caused by the Rx matched filter 1309 performing FTN.

The controller 1301 can remove the FTN CP and CS from the FTN-applied received signal block through the FTN CP and CS remover 1311. The controller 1301 can convert the FTN CP and CS-removed received signal block from the time domain to the frequency domain through the FFT unit 1313. The controller 1301 can equalize the frequency-domain received signal block through the FDE 1315. The controller 1301 can convert the equalized received signal block from the frequency domain to the time domain through the IFFT unit 1317. The controller 1301 can decode the converted time-domain received signal block to reconstruct data.

The transmitter 101 of FIG. 12 pre-equalizes a transmitted signal block to eliminate ISI caused by the Tx pulse shaping filter 1211 and transmits the transmitted signal block using FTN signaling. The receiver 103 of FIG. 13 equalizes a received signal block to eliminate ISI caused by the channel 105 and the Rx matched filter 1309.

The transmission scheme applied to the transmitter 101 of FIG. 12 and the receiver 103 of FIG. 13 can be referred to as a POP-FTN-SC-FDE transmission scheme. A POP-FTN-SC-FDE communication system can efficiently estimate data in view of a delay caused when a transmitter acquires channel information fed back from a receiver and computational complexity of the receiver in channel estimation.

Figure 14:
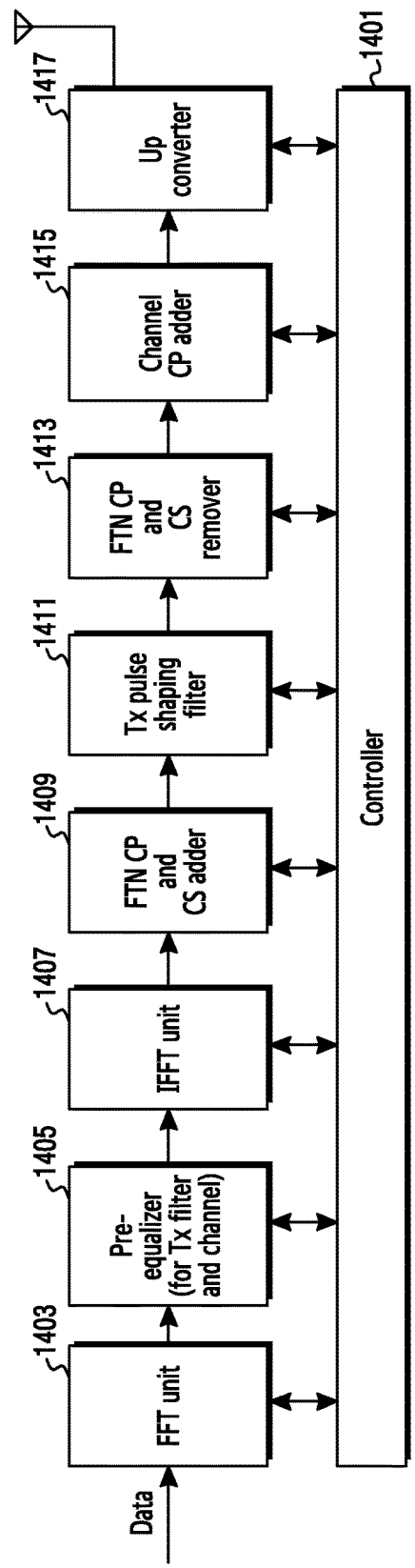
FIG. 14 is a block diagram of a transmitter according to a fifth exemplary embodiment of the present disclosure.

FIG. 14 is a block diagram of a transmitter according to a fifth exemplary embodiment of the present disclosure.

Referring to FIG. 14, a transmitter 101 can include a controller 1401, an FFT unit 1403, a pre-FDE 1405, an IFFT unit 1407, an FTN CP and CS adder 1409, a Tx pulse shaping filter 1411, an FTN CP and CS remover 1413, a channel CP adder 1415, and an up converter 1417.

Comparing with the transmitter 101 of FIG. 12, the transmitter 101 of FIG. 14 includes the pre-FDE 1405 for the channel 105 and the Tx pulse shaping filter 1411, instead of the pre-FDE 1205 for the Tx pulse shaping filter 1211 of FIG. 12. Thus, hereinafter, the pre-FDE 1405 is described in detail, while the description of the other components (the FFT unit 1403, the IFFT unit 1407, the FTN CP and CS adder 1409, the Tx pulse shaping filter 1411, the FTN CP and CS remover 1413, the channel CP adder 1415, and the up converter 1417) is omitted.

Describing each component, the pre-FDE 1405 can receive a frequency-domain transmitted signal block from the FFT unit 1403, can perform Pre-equalization for a Channel and Pulse shaping filter (PCP) on the transmitted signal block with respect to the channel 105 and the Tx pulse shaping filter 1411, and can output the pre-equalized transmitted signal block to the IFFT unit 1407.

For example, the pre-FDE 1405 can estimate ISI caused by the channel 105 based on CSI received from a receiver 103 and can determine a weighting matrix for eliminating the estimated ISI caused by the channel 105 and ISI caused by the Tx pulse shaping filter 1411.

A weighting matrix $P_{pcp}$ for PCP can be represented by the following equation.

$$P_{pcp} = A_{pcp}(\Lambda_{tx}^H \Lambda_{tx})^{-1}\Lambda_{tx}^H \qquad \text{[Equation 32]}$$
$$= A_{pcp}(\Lambda_{tc}^H \Lambda_c^H \Lambda_c \Lambda_{tc})^{-1}\Lambda_{tc}^H \Lambda_c^H$$

Here, $P_{pcp}$ denotes a weighting matrix for PCP. $A_{pcp} = \sqrt{N/tr\{(\Lambda_{tx}^H \Lambda_{tx})^{-1}\}}$ denotes a power scaling factor required to pre-equalize ISI from the pulse shaping filter and the channel. $\Lambda_{tx} = \Lambda_c \Lambda_{tc}$ 이다.

The pre-FDE 1405 can pre-equalize the frequency-domain transmitted signal block based on the determined weighting matrix and can transmit the transmitted signal block to the IFFT unit 1407.

The controller 1401 can control overall operations of the transmitter 101. For example, the controller 1401 can control the FFT unit 1403, the pre-FDE 1405, the IFFT unit 1407, the FTN CP and CS adder 1409, the Tx pulse shaping filter 1411, the FTN CP and CS remover 1413, the channel CP adder 1415, and the up converter 1417.

For example, the controller 1401 can pre-equalize a transmitted signal block through the FFT unit 1403, the pre-FDE 1405, and the IFFT unit 1407 to eliminate ISI caused by the Tx pulse shaping filter 1411 and the channel 105.

The controller 1401 can add an FTN CP and CS to the transmitted signal block through the FTN CP and CS adder 1409. The controller 1401 can filter the FTN CP and CS-added transmitted signal block with a pulse-shaped filter for sampling according to FTN and can perform FTN through the Tx pulse shaping filter 1411. Here, the FTN CP and CS of the FTN-applied transmitted signal block can include IBI caused by the Tx pulse shaping filter 1411 performing FTN. The controller 1401 can remove the FTN CP and CS from the FTN-applied transmitted signal block through the FIN CP and CS remover 1413.

The controller 1401 can add a channel CP to the FTN CP and CS-removed transmitted signal block through the channel CP adder 1415. The controller 1401 can up-convert the channel CP-added transmitted signal block into an RF through the up converter 1417 and can transmit the transmitted signal block to the receiver 103 through the channel 105.

Figure 15:
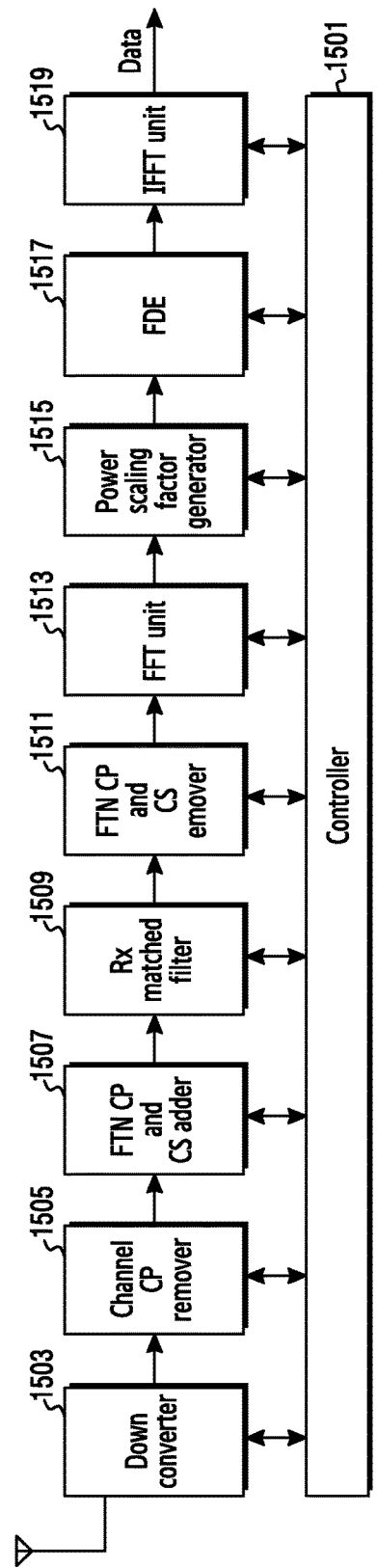
FIG. 15 is a block diagram of a receiver according to the fifth exemplary embodiment of the present disclosure.

FIG. 15 is a block diagram of a receiver according to the fifth exemplary embodiment of the present disclosure.

Referring to FIG. 15, a receiver 103 can include a controller 1501, a down converter 1503, a channel CP remover 1505, an FTN CP and CS adder 1507, an Rx matched filter 1509, an FTN CP and CS remover 1511, an FFT unit 1513, a power scaling factor generator 1515, an FDE 1517, and an IFFT unit 1519.

Comparing with the receiver 103 of FIG. 13, the receiver 103 of FIG. 15 further includes the power scaling factor generator 1515 in addition to FIG. 13 and includes the FDE 1517 for the Rx matched filter 1507, instead of the FDE 1315 of FIG. 13 for the channel 105 and the Rx matched filter 1307. Thus, hereinafter, the power scaling factor generator 1515 and the FDE 1517 are described in detail, while the description of the other components (the down converter 1503, the channel CP remover 1505, the FTN CP and CS adder 1507, the Rx matched filter 1509, the FTN CP and CS remover 1511, the FFT unit 1513, and the IFFT unit 1519) is omitted.

According to one exemplary embodiment, the receiver 103 can be a receiver corresponding to the transmitter 101 of FIG. 14. For example, the transmitter 101 of FIG. 14 can pre-equalize a transmitted signal block in view of ISI by the channel 105 and the Tx pulse shaping filter 1411 and can transmit the pre-equalized transmitted signal block according to FTN signaling. The receiver 103 can receive a received signal block according to FTN signaling and can equalize the received signal block, which is not pre-equalized, in view of ISI by the Rx matched filter 1509 to reconstruct data.

The SC transmission/reception scheme, which is used by the transmitter 101 of FIG. 14 and the receiver 103 of FIG. 15, can be referred to as a PCP-FTN-SC-FDE transmission scheme.

Describing each component, the power scaling factor generator 1515 can receive a frequency-domain received signal block from the FFT unit 1513 and can generate a power scaling factor for the received signal block. The power scaling factor generator 1515 can compensate for the signal size of the frequency-domain received signal block based on the generated power scaling factor and can transmit the frequency-domain received signal block to the FDE 1517.

For example, a frequency-domain received signal block according to the PCP-FTN-SC-FDE transmission scheme can be represented by the following equation.

$$Z_{pcp\text{-}ftnscfde} = A_{pcp}^{-1} FG_{rc} v \qquad \text{[Equation 33]}$$
$$= \underbrace{A_{pcp}^{-1} FG_{rc}}_{receiver} \underbrace{H_c}_{channel} \underbrace{G_{tc}F^H(P_{pcp})Fd}_{transmitter} +$$
$$\underbrace{A_{pcp}^{-1} FG_{rc} n}_{noise}$$
$$= A_{pcp}^{-1} \Lambda_\alpha A_{pcp} \underbrace{\{(\Lambda_{tx}^H \Lambda_{tx})^{-1}\Lambda_{tx}^H\}}_{P_{pcp}} Fd +$$
$$A_{pcp}^{-1} FG_{rc} n$$
$$= \Lambda_{rc} Fd + \underbrace{A_{pop}^{-1} FG_{rc} n}_{n_f}$$

Here, $Z_{pcp\text{-}ftnscfde}$ denotes a frequency-domain received signal block, which is pre-equalized in view of ISI caused by the Tx pulse shaping filter 1411 of the transmitter 101 and the channel 105. $A_{pcp}^{-1}$ denotes the inverse function of a power scaling factor $A_{pcp}$ applied in PE. The last term in Equation 33 is derived from $FG_{rc}H_cG_{tc}F^H = \Lambda_\alpha$ and $\Lambda_\alpha(\Lambda_{tx}^H\Lambda_{tx})^{-1}\Lambda_{tx}^H = \Lambda_{rc}\Lambda_{tx}(\Lambda_{tx}^H\Lambda_{tx})^{-1}\Lambda_{tx}^H = \Lambda_{rc}$.

For example, the power scaling factor generator 1515 can change the signal size of the frequency-domain received signal block based on the power scaling factor $A_{pcp}^{-1}$.

The FDE 1517 can receive the frequency-domain received signal block from the power scaling factor 1515, can equalize the received signal block in view of ISI by the Rx matched filter 1509, and can transmit the equalized received signal block to the IFFT unit 1519. For example, the FDE 1517 can determine a weighting matrix for equalization and can equalize the frequency-domain received signal block based on the determined weighting matrix.

If the FDE 1517 is a linear MIVISE equalizer, the linear MIVISE equalizer can determine a weighting matrix using the following equation.

$$W_{pcp} = R_D \Lambda_{rc}^H (R_{n_f} + \Lambda_{rc} R_D \Lambda_{rc}^H)^{-1} \quad \text{[Equation 34]}$$

$$= \sigma_d^2 \Lambda_{rc}^H (A_{pcp}^{-2} \sigma_n^2 \Lambda_{rc} \Lambda_{rc}^H + \sigma_d^2 \Lambda_{rc} \Lambda_{rc}^H)^{-1}$$

$$= \left( \frac{\sigma_d^2}{\sigma_d^2 + A_{pcp}^{-2} \sigma_n^2} \right) \Lambda_{rc}^H (\Lambda_{rc} \Lambda_{rc}^H)^{-1}$$

Here, $W_{pcp}$ denotes a weighting matrix for equalization. $R_{n_f} = A_{pcp}^{-2} E\{FG_{rc}n(FG_{rc}n)^H\} = A_{pcp}^{-2} \sigma_n^2 \Lambda_{rc} \Lambda_{rc}^H$.

If the FDE 1517 is a ZF equalizer, the ZF equalizer can determine a weighting matrix using the following equation.

$$W_{pcp} = \Lambda_{rc}^\dagger = (\Lambda_{rc}^H \Lambda_{rc})^{-1} \Lambda_{rc}^H \quad \text{[Equation 35]}$$

Here, $W_{pcp}$ denotes a weighting matrix for equalization.

For example, the FDE 1517 can multiply the frequency-domain received signal block by $W_{pcp}$ to equalize the frequency-domain received signal block.

The IFFT unit 1519 can receive the equalized frequency-domain received signal block and can apply an IFFT algorithm to the frequency-domain received signal block, thereby determining a time-domain received signal block.

For example, the IFFT unit 1519 can determine a time-domain received signal block using the following equation.

$$\hat{d}_{pcp\text{-}ftnscfde} = F^H (W_{pcp}) Z_{pcp\text{-}ftnscfde} \quad \text{[Equation 36]}$$

$$= F^H (W_{pcp}) \Lambda_{rc} Fd + A_{pop}^{-1} F^H (W_{pcp}) \Lambda_{rc} Fn$$

Here, $\hat{d}_{pcp\text{-}ftnscfde}$ denotes time-domain estimated data (for example, a received signal block).

Meanwhile, time-domain estimated data $\hat{d}_{pcp\text{-}ftnscfde}$ can be expressed as follows from the viewpoint of the ZF equalizer and the linear MMSE equalizer.

$$\hat{d}_{pcp\text{-}ftnscfde}^{ZF} = d + A_{pcp}^{-1} F^H (\Lambda_{rc}^H \Lambda_{rc})^{-1} \Lambda_{rc}^H \Lambda_{rc} Fn \quad \text{[Equation 37]}$$

$$= d + A_{pcp}^{-1} F^H Fn = d + A_{pcp}^{-1} n$$

$$\hat{d}_{pcp\text{-}ftnscfde}^{MMSE} = \left( \frac{\sigma_n^2}{\sigma_d^2 + A_{pcp}^{-2} \sigma_n^2} \right) d + A_{pcp}^{-1} \left( \frac{\sigma_d^2}{\sigma_d^2 + A_{pcp}^{-2} \sigma_n^2} \right) n$$

The controller 1501 can control overall operations of the receiver 103. For example, the controller 1501 can control the down converter 1503, the channel CP remover 1505, the FTN CP and CS adder 1507, the Rx matched filter 1509, the FTN CP and CS remover 1511, the FFT unit 1513, the power scaling factor generator 1515, the FDE 1517, and the IFFT unit 1519.

For example, the controller 1501 can down-convert a received signal block into a base band through the down converter 1503. The controller 1501 can remove a channel CP from the converted received signal block through the channel CP remover 1505. The controller 1501 can add an FTN CP and CS to the channel CP-removed received signal block through the FTN CP and CS adder 1507. The controller 1501 can filter the FTN CP and CS-added received signal block with a pulse-shaped filter for sampling according to FTN and can perform FTN through the Rx matched filter 1509. Here, the FTN CP and CS of the FTN-applied received signal block can include IBI caused by the Rx matched filter 1509 performing FTN.

The controller 1501 can remove the FTN CP and CS from the FTN-applied received signal block through the FTN CP and CS remover 1511. The controller 1501 can convert the FTN CP and CS-removed received signal block from the time domain to the frequency domain through the FFT unit 1513. The controller 1501 can compensate for the signal size of the frequency-domain received signal block through the power scaling factor generator 1515. The controller 1501 can equalize the frequency-domain received signal block through the FDE 1517. The controller 1501 can convert the equalized received signal block from the frequency domain to the time domain through the IFFT unit 1519. The controller 1501 can decode the converted time-domain received signal block to reconstruct data.

Figure 16:
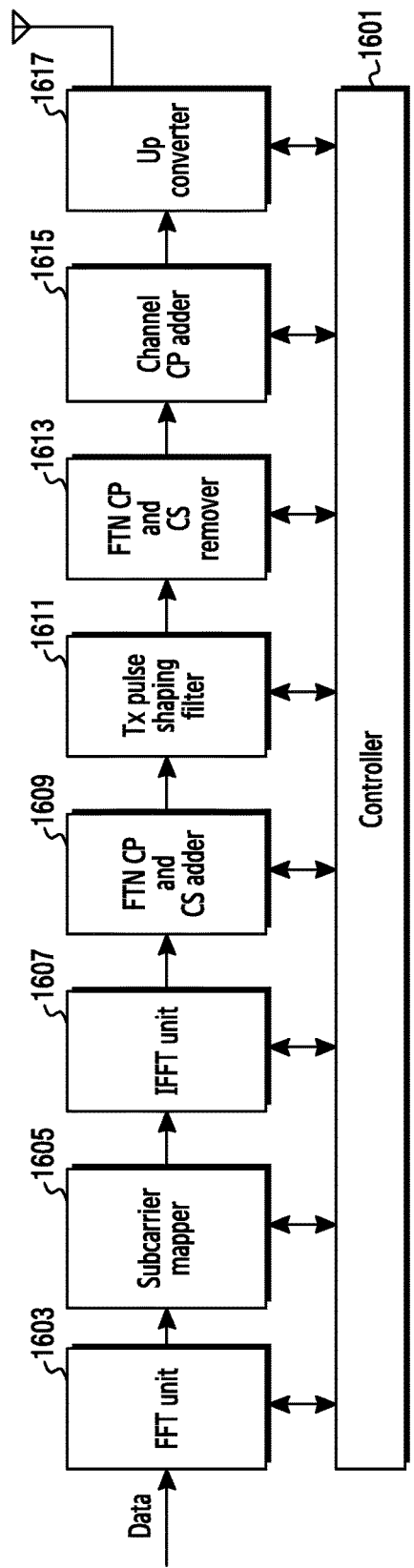
FIG. 16 is a block diagram of a transmitter according to a sixth exemplary embodiment of the present disclosure.

FIG. 16 is a block diagram of a transmitter according to a sixth exemplary embodiment of the present disclosure.

Referring to FIG. 16, a transmitter 101 can include a controller 1601, an FFT unit 1603, a subcarrier mapper 1605, an IFFT unit 1607, an FTN CP and CS adder 1609, a Tx pulse shaping filter 1611, an FTN CP and CS remover 1613, a channel CP adder 1615, and an up converter 1617. For example, the transmitter 101 of FIG. 16 can be a transmitter according to an FTN signaling-based SC-Frequency Division Multiple Access (FTN-SC-FDMA) transmission scheme.

Comparing with the transmitter 101 of FIG. 2, the transmitter 101 of FIG. 16 further includes the FFT unit 1603, the subcarrier mapper 1605, and the IFFT unit 1607 in addition to the transmitter 101 of FIG. 2. Thus, hereinafter, the FFT unit 1603, the subcarrier mapper 1605, and the IFFT unit 1607 are described in detail, while the description of the other components (the FTN CP and CS adder 1609, the Tx pulse shaping filter 1611, the FTN CP and CS remover 1613, the channel CP adder 1615, and the up converter 1617) is omitted.

Describing each component, the FFT unit 1603 can receive a time-domain transmitted signal block, can perform an FFT algorithm on the transmitted signal block to convert the transmitted signal block from the time domain into the frequency domain, and can output the converted transmitted signal block to the subcarrier mapper 1605.

The subcarrier mapper 1605 can receive the frequency-domain transmitted signal block from the FFT unit 1603, can map the transmitted signal block to a subcarrier, and can transmit the mapped transmitted signal block to the IFFT unit 1607.

The IFFT unit 1607 can receive the subcarrier-mapped transmitted signal block from the subcarrier mapper 1605, can perform an IFFT algorithm to the transmitted signal block to convert the transmitted signal block from the frequency domain to the time domain, and can transmit the converted transmitted signal block to the FTN CP and CS adder 1609.

The controller 1601 can control overall operations of the transmitter 101. For example, the controller 1601 can control the FFT unit 1603, the subcarrier mapper 1605, the IFFT unit 1607, the FTN CP and CS adder 1609, the Tx pulse shaping filter 1611, the FTN CP and CS remover 1613, the channel CP adder 1615, and the up converter 1617.

For example, the controller 1601 can map a transmitted signal block to a subcarrier through the FFT unit 1603, the subcarrier mapper 1605, and the IFFT unit 1607. The controller 1601 can add an FTN CP and CS to the transmitted signal block through the FTN CP and CS adder 1609. The controller 1601 can filter the FTN CP and CS-added transmitted signal block with a pulse-shaped filter for sampling according to FTN and can perform FTN through the Tx pulse shaping filter 1611. Here, the FTN CP and CS of the FTN-applied transmitted signal block can include IBI caused by the Tx pulse shaping filter 1611 performing FTN.

The controller 1601 can remove the FTN CP and CS from the FTN-applied transmitted signal block through the FIN CP and CS remover 1613.

The controller 1601 can add a channel CP to the FTN CP and CS-removed transmitted signal block through the channel CP adder 1615. The controller 1601 can up-convert the channel CP-added transmitted signal block into an RF through the up converter 1617 and can transmit the transmitted signal block to the receiver 103 through the channel 105.

Figure 17:
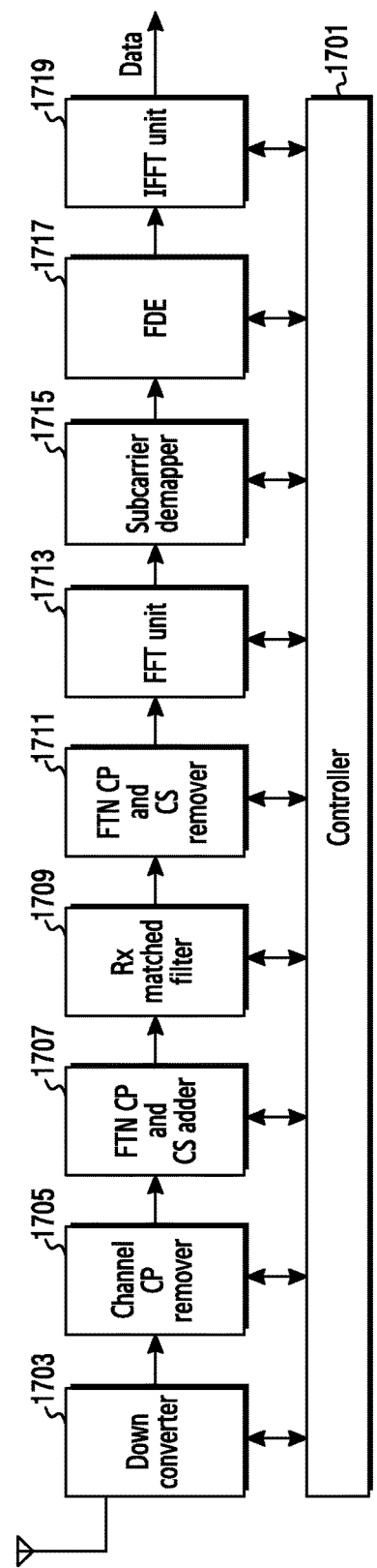
FIG. 17 is a block diagram of a receiver according to the sixth exemplary embodiment of the present disclosure.

FIG. 17 is a block diagram of a receiver according to the sixth exemplary embodiment of the present disclosure.

Referring to FIG. 17, a receiver 103 can include a controller 1701, a down converter 1703, a channel CP remover 1705, an FTN CP and CS adder 1707, an Rx matched filter 1709, an FTN CP and CS remover 1711, an FFT unit 1713, a subcarrier demapper 1715, an FDE 1717, and an IFFT unit 1719. For example, the receiver 103 of FIG. 17 can be a receiver according to the FTN-SC-FDMA transmission scheme.

The receiver 103 of FIG. 17 is a receiver corresponding to the transmitter 101 of FIG. 16 and further includes the subcarrier demapper 1715 in comparison with the receiver 103 of FIG. 4. Thus, hereinafter, the description of the components (the controller 1701, the down converter 1703, the channel CP remover 1705, the FTN CP and CS adder 1707, the Rx matched filter 1709, the FTN CP and CS remover 1711, the FFT unit 1713, the FDE 1717, and the IFFT unit 1719) other than the subcarrier demapper 1715 is omitted.

Describing each component, the subcarrier demapper 1715 can receive a frequency-domain received signal block from the FFT unit 1713, can demap a subcarrier from the received signal block, and can transmit the demapped received signal block to the IFFT unit 1717.

The controller 1701 can control overall operations of the receiver 103. For example, the controller 1701 can control the down converter 1703, the channel CP remover 1705, the FTN CP and CS adder 1707, the Rx matched filter 1709, the FTN CP and CS remover 1711, the FFT unit 1713, the subcarrier demapper 1715, the FDE 1717, and the IFFT unit 1719.

For example, the controller 1701 can down-convert a received signal block into a base band through the down converter 1703. The controller 1701 can remove a channel CP from the converted received signal block through the channel CP remover 1705. The controller 1701 can add an FTN CP and CS to the channel CP-removed received signal block through the FTN CP and CS adder 1707. The controller 1701 can filter the FTN CP and CS-added received signal block with a pulse-shaped filter for sampling according to FTN and can perform FTN through the Rx matched filter 1709. Here, the FTN CP and CS of the FTN-applied received signal block can include IBI caused by the Rx matched filter 1709 performing FTN.

The controller 1701 can remove the FTN CP and CS from the FTN-applied received signal block through FTN CP and CS remover 1711. The controller 1701 can convert the FTN CP and CS-removed received signal block from the time domain to the frequency domain through the FFT unit 1713. The controller 1701 can demap a subcarrier from the frequency-domain received signal block through the subcarrier demapper 1715. The controller 1701 can convert the received signal block from the frequency domain to the time domain through the IFFT unit 1719. The controller 1701 can decode the converted time-domain received signal block to reconstruct data.

Figure 18:
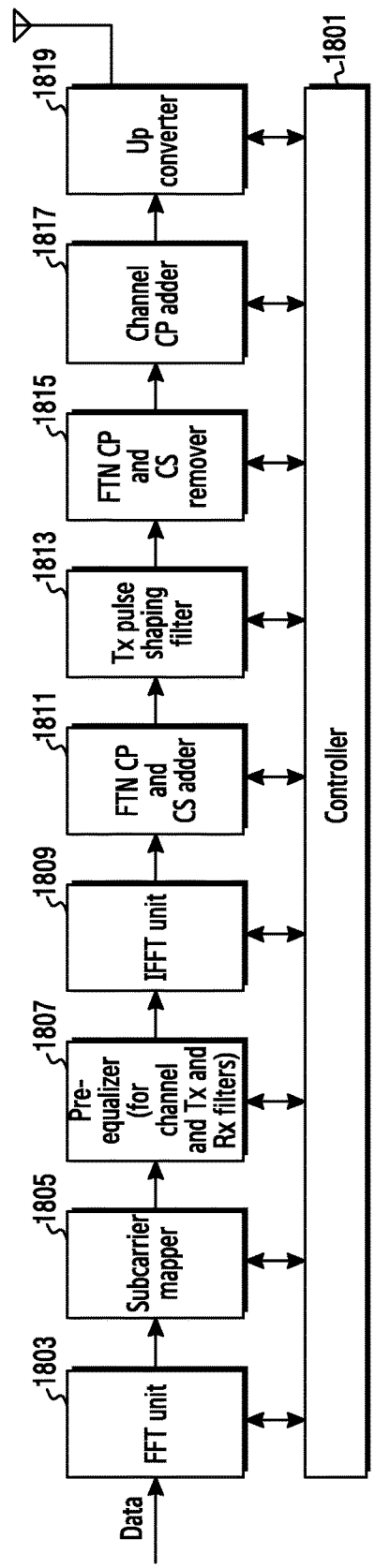
FIG. 18 is a block diagram of a transmitter according to a seventh exemplary embodiment of the present disclosure.

FIG. 18 is a block diagram of a transmitter according to a seventh exemplary embodiment of the present disclosure.

Referring to FIG. 18, a transmitter 101 can include a controller 1801, an FFT unit 1803, a subcarrier mapper 1805, a pre-FDE 1807, an IFFT unit 1809, an FTN CP and CS adder 1811, a Tx pulse shaping filter 1813, an FTN CP and CS remover 1815, a channel CP adder 1817, and an up converter 1819.

For example, the pre-FDE 1807 of the transmitter 101 can perform PE in view of ISI caused by the channel 105, the Tx pulse shaping filter 1813, and the Rx matched filter of the receiver 103 corresponding to the Tx pulse shaping filter 1813. Here, the transmitter 101 can be a transmitter according to a PE-FTN-SC-FDMA transmission scheme.

Comparing with the transmitter 101 of FIG. 10, the transmitter 101 of FIG. 18 further includes a subcarrier mapper 1805. Thus, hereinafter, the subcarrier mapper 1805 is described in detail, while the description of the other components (the FFT unit 1803, the pre-FDE 1807, the IFFT unit 1809, the FTN CP and CS adder 1811, the Tx pulse shaping filter 1813, the FTN CP and CS remover 1815, the channel CP adder 1817, and the up converter 1819) is omitted.

Describing each component, the subcarrier mapper 1805 can receive a frequency-domain transmitted signal block from the FFT unit 1803, can map the transmitted signal block to a subcarrier, and can transmit the mapped transmitted signal block to the pre-FDE 1807.

The controller 1801 can control overall operations of the transmitter 101. For example, the controller 1801 can control the FFT unit 1803, the subcarrier mapper 1805, the pre-FDE 1807, the IFFT unit 1809, the FTN CP and CS adder 1811, the Tx pulse shaping filter 1813, the FTN CP and CS remover 1815, the channel CP adder 1817, and the up converter 1819.

For example, the controller 1801 can map a frequency-domain transmitted signal block to a subcarrier and can pre-equalize the mapped transmitted signal block in view of ISI caused by the channel 105, the Tx pulse shaping filter 1813, and the Rx matched filter through the FFT unit 1803, the pre-FDE 1807, the subcarrier mapper 1805, and the IFFT unit 1809. The controller 1801 can add an FTN CP and CS to the transmitted signal block through the FTN CP and CS adder 1811. The controller 1801 can filter the FTN CP and CS-added transmitted signal block with a pulse-shaped filter for sampling according to FTN and can perform FTN through the Tx pulse shaping filter 1813. Here, the FTN CP and CS of the FTN-applied transmitted signal block can include IBI caused by the Tx pulse shaping filter 1813 performing FTN. The controller 1801 can remove the FTN CP and CS from the FTN-applied transmitted signal block through the FIN CP and CS remover 1815.

The controller 1801 can add a channel CP to the FTN CP and CS-removed transmitted signal block through the channel CP adder 1817. The controller 1801 can up-convert the channel CP-added transmitted signal block into an RF through the up converter 1819 and can transmit the transmitted signal block to the receiver 103 through the channel 105.

Figure 19:
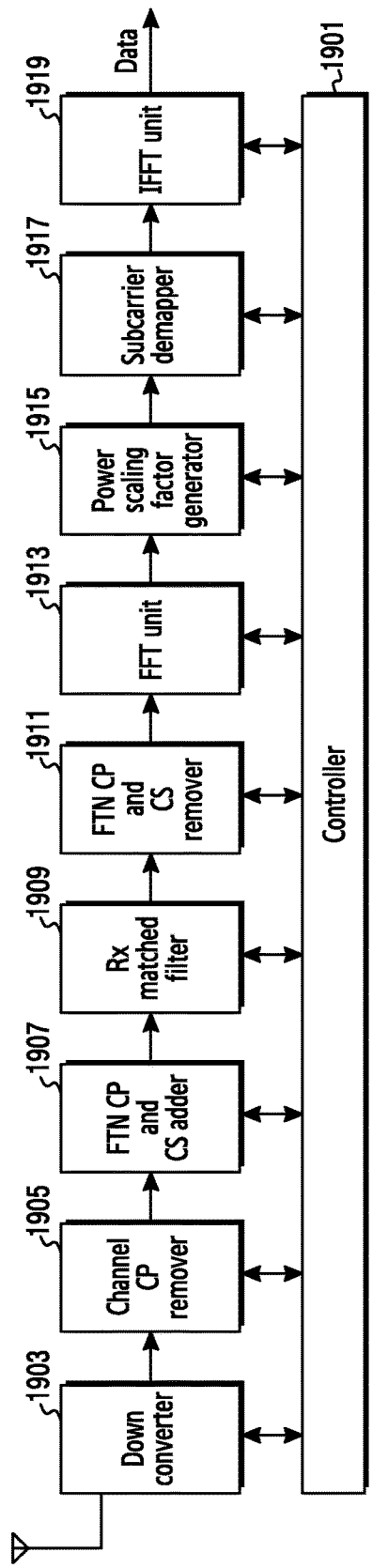
FIG. 19 is a block diagram of a receiver according to the seventh exemplary embodiment of the present disclosure.

FIG. 19 is a block diagram of a receiver according to the seventh exemplary embodiment of the present disclosure.

Referring to FIG. 19, a receiver 103 can include a controller 1901, a down converter 1903, a channel CP remover 1905, an FTN CP and CS adder 1907, an Rx matched filter 1909, an FTN CP and CS remover 1911, an FFT unit 1913, a power scaling factor generator 1915, a subcarrier demapper 1917, and an IFFT unit 1919.

For example, when the receiver 103 is a receiver corresponding to the transmitter 101 of FIG. 18, the receiver 103 can be a receiver according to the PE-FDE-SC-FDMA transmission scheme.

Comparing with the receiver 103 of FIG. 11, the receiver 103 of FIG. 19 further includes the subcarrier demapper 1917. Thus, hereinafter, the description of the components (the down converter 1903, the channel CP remover 1905, the FTN CP and CS adder 1907, the Rx matched filter 1909, the FTN CP and CS remover 1911, the FFT unit 1913, the power scaling factor generator 1915, and the IFFT unit 1919) other than the subcarrier demapper 1917 is omitted.

Describing each component, the subcarrier demapper 1917 can receive a received signal block with a compensated signal size from the power scaling factor generator 1915, can demap a subcarrier from the received signal block, and can transmit the demapped received signal block to the IFFT unit 1919.

The controller 1901 can control overall operations of the receiver 103. For example, the controller 1901 can control the down converter 1903, the channel CP remover 1905, the FTN CP and CS adder 1907, the Rx matched filter 1909, the FTN CP and CS remover 1911, the FFT unit 1913, the power scaling factor generator 1915, the subcarrier demapper 1917, and the IFFT unit 1919.

For example, the controller 1901 can down-convert a received signal block into a base band through the down converter 1903. The controller 1901 can remove a channel CP from the converted received signal block through the channel CP remover 1905. The controller 1901 can add an FTN CP and CS to the channel CP-removed received signal block through the FTN CP and CS adder 1907. The controller 1901 can filter the FTN CP and CS-added received signal block with a pulse-shaped filter for sampling according to FTN and can perform FTN through the Rx matched filter 1909. Here, the FTN CP and CS of the FTN-applied received signal block can include IBI caused by the Rx matched filter 1909 performing FTN.

The controller 1901 can remove the FTN CP and CS from the FTN-applied received signal block through FTN CP and CS remover 1911. The controller 1901 can convert the FTN CP and CS-removed received signal block from the time domain to the frequency domain through the FFT unit 1913. The controller 1901 can generate a power scaling factor for the frequency-domain received signal block and can compensate for the signal size of the received signal block based on the generated power scaling factor through the power scaling factor generator 1915. The controller 1901 can demap a subcarrier from the compensated received signal block through the subcarrier demapper 1917. The controller 1901 can convert the demapped received signal block from the frequency domain to the time domain through the IFFT unit 1919. The controller 1901 can decode the converted time-domain received signal block to reconstruct data.

In one exemplary embodiment, the controller 1901 can generate CSI and can feed the generated CSI back to the transmitter 101.

Figure 20:
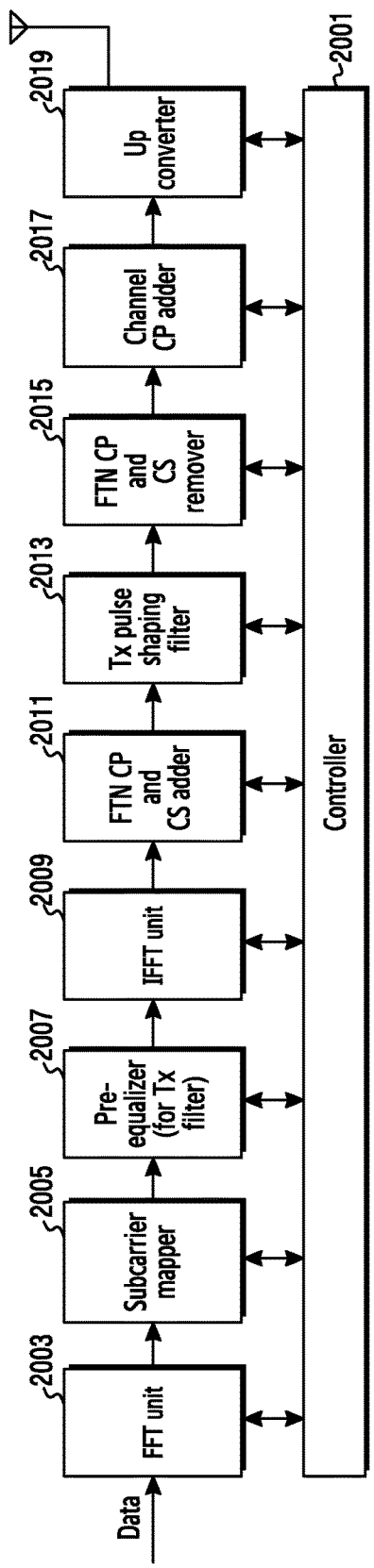
FIG. 20 is a block diagram of a transmitter according to an eighth exemplary embodiment of the present disclosure.

FIG. 20 is a block diagram of a transmitter according to an eighth exemplary embodiment of the present disclosure.

Referring to FIG. 20, a transmitter 101 can include a controller 2001, an FFT unit 2003, a pre-FDE 2007, a subcarrier mapper 2005, an IFFT unit 2009, an FTN CP and CS adder 2011, a Tx pulse shaping filter 2013, an FTN CP and CS remover 2015, a channel CP adder 2017, and an up converter 2019.

For example, the pre-FDE 2007 of the transmitter 101 can perform PE in view of only ISI caused by the Tx pulse shaping filter 2013. Here, the transmitter 101 can be referred to as a transmitter according to a POP-FTN-SC-FDMA transmission scheme.

Comparing with the transmitter 101 of FIG. 12, the transmitter 101 of FIG. 20 further includes the subcarrier mapper 2005. Thus, hereinafter, the subcarrier mapper 2005 is described in detail, while the description of the other components (the FFT unit 2003, the pre-FDE 2007, the IFFT unit 2009, the FTN CP and CS adder 2011, the Tx pulse shaping filter 2013, the FTN CP and CS remover 2015, the channel CP adder 2017, and the up converter 2019) is omitted.

Describing each component, the subcarrier mapper 2005 can receive a frequency-domain transmitted signal block from the FFT unit 2003, can map the transmitted signal block to a subcarrier, and can transmit the mapped transmitted signal block to the pre-FDE 2007.

The controller 2001 can control overall operations of the transmitter 101. For example, the controller 2001 can control the FFT unit 2003, the pre-FDE 2007, the subcarrier mapper 2005, the IFFT unit 2009, the FTN CP and CS adder 2011, the Tx pulse shaping filter 2013, the FTN CP and CS remover 2015, the channel CP adder 2017, and the up converter 2019.

For example, the controller 2001 can map a frequency-domain transmitted signal block to a subcarrier and can pre-equalize the mapped transmitted signal block in view of ISI caused by the Tx pulse shaping filter 2013 through the FFT unit 2003, the pre-FDE 2007, the subcarrier mapper 2005, and the IFFT unit 2009. The controller 2001 can add an FTN CP and CS to the transmitted signal block through the FTN CP and CS adder 2011. The controller 2001 can filter the FTN CP and CS-added transmitted signal block with a pulse-shaped filter for sampling according to FTN and can perform FTN through the Tx pulse shaping filter 2013. Here, the FTN CP and CS of the FTN-applied transmitted signal block can include IBI caused by the Tx pulse shaping filter 2013 performing FTN. The controller 2001 can remove the FTN CP and CS from the FTN-applied transmitted signal block through the FIN CP and CS remover 2015.

The controller 2001 can add a channel CP to the FTN CP and CS-removed transmitted signal block through the channel CP adder 2017. The controller 2001 can up-convert the channel CP-added transmitted signal block into an RF through the up converter 2019 and can transmit the transmitted signal block to the receiver 103 through the channel 105.

Figure 21:
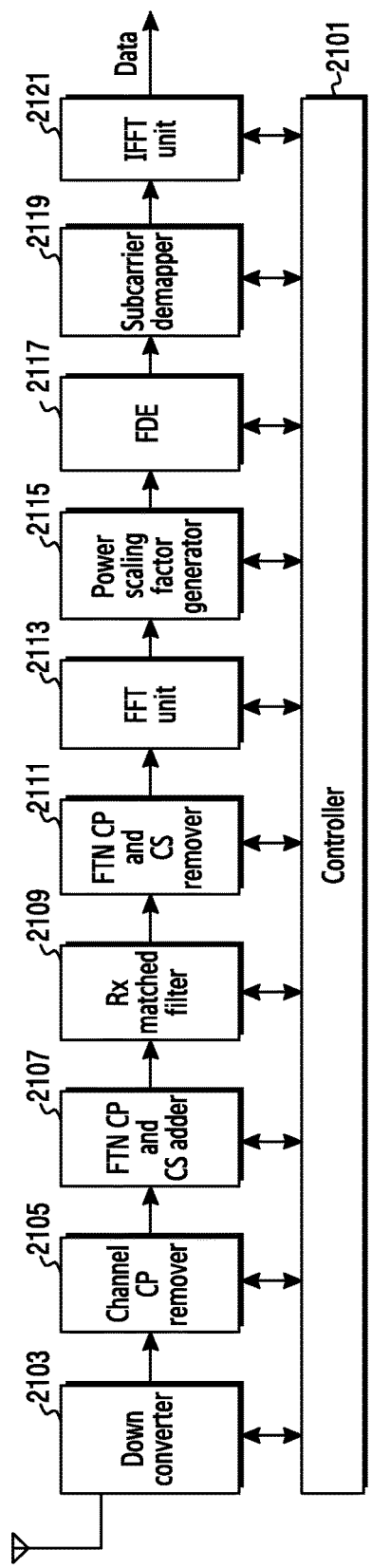
FIG. 21 is a block diagram of a receiver according to the eighth exemplary embodiment of the present disclosure.

FIG. 21 is a block diagram of a receiver according to the eighth exemplary embodiment of the present disclosure.

Referring to FIG. 21, a receiver 103 can include a controller 2101, a down converter 2103, a channel CP remover 2105, an FTN CP and CS adder 2107, an Rx matched filter 2109, an FTN CP and CS remover 2111, an FFT unit 2113, a power scaling factor generator 2115, an FDE 2117, a subcarrier demapper 2119 and an IFFT unit 2121.

For example, when the receiver 103 is a receiver corresponding to the transmitter 101 of FIG. 20, the receiver 103 can be referred to as a receiver according to the POP-FDE-SC-FDMA transmission scheme.

Comparing with the receiver 103 of FIG. 13, the receiver 103 of FIG. 21 further includes the subcarrier demapper 2119. Thus, hereinafter, the description of the components (the down converter 2103, the channel CP remover 2105, the FTN CP and CS adder 2107, the Rx matched filter 2109, the FTN CP and CS remover 2111, the FFT unit 2113, the power scaling factor generator 2115, the FDE 2117, and the IFFT unit 2121) other than the subcarrier demapper 2119 is omitted.

Describing each component, the subcarrier demapper 2119 can receive an equalized frequency-domain received signal block from the FDE 2117, can demap a subcarrier from the received signal block, and can transmit the demapped received signal block to the IFFT unit 2121.

The controller 2101 can control overall operations of the receiver 103. For example, the controller 2101 can control the down converter 2103, the channel CP remover 2105, the FTN CP and CS adder 2107, the Rx matched filter 2109, the FTN CP and CS remover 2111, the FFT unit 2113, the power scaling factor generator 2115, the subcarrier demapper 2119, the FDE 2117, and the IFFT unit 2121.

For example, the controller 2101 can down-convert a received signal block into a base band through the down converter 2103. The controller 2101 can remove a channel CP from the converted received signal block through the channel CP remover 2105. The controller 2101 can add an FTN CP and CS to the channel CP-removed received signal block through the FTN CP and CS adder 2107. The controller 2101 can filter the FTN CP and CS-added received signal block with a pulse-shaped filter for sampling according to FTN and can perform FTN through the Rx matched filter 2109. Here, the FTN CP and CS of the FTN-applied received signal block can include IBI caused by the Rx matched filter 2109 performing FTN.

The controller 2101 can remove the FTN CP and CS from the FTN-applied received signal block through FTN CP and CS remover 2111. The controller 2101 can convert the FTN CP and CS-removed received signal block from the time domain to the frequency domain through the FFT unit 2113. The controller 2101 can generate a power scaling factor for the frequency-domain received signal block and can compensate for the signal size of the received signal block based on the generated power scaling factor through the power scaling factor generator 2115. The controller 2101 can equalize the received signal block in view of ISI caused by the channel 105 and the Rx matched filter 2109 through the FDE 2117. The controller 2101 can demap a subcarrier from the equalized received signal block through the subcarrier demapper 2119. The controller 2101 can convert the demapped received signal block from the frequency domain to the time domain through the IFFT unit 2121. The controller 2101 can decode the converted time-domain received signal block to reconstruct data.

Figure 22:
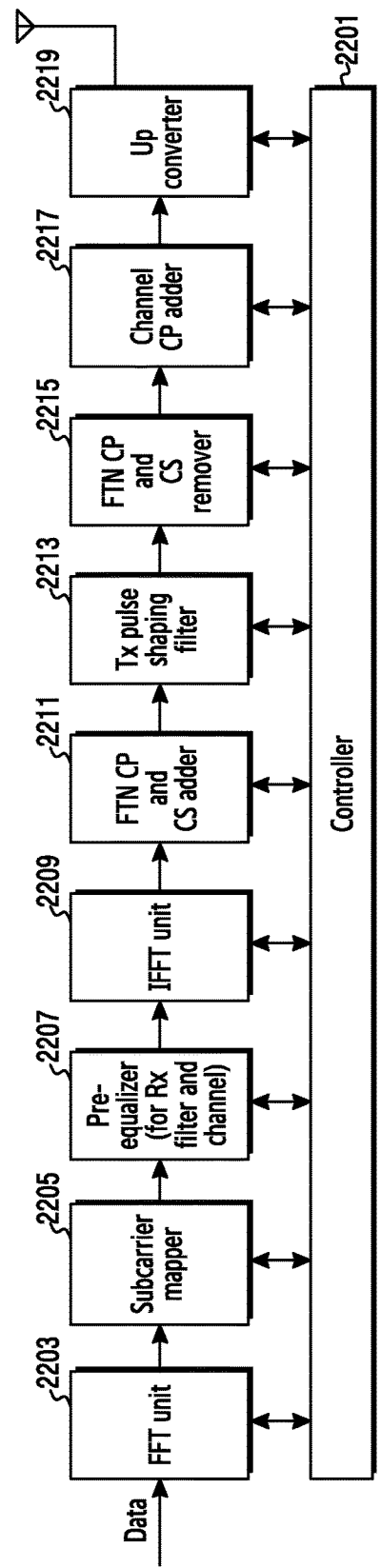
FIG. 22 is a block diagram of a transmitter according to a ninth exemplary embodiment of the present disclosure.

FIG. 22 is a block diagram of a transmitter according to a ninth exemplary embodiment of the present disclosure.

Referring to FIG. 22, a transmitter 101 can include a controller 2201, an FFT unit 2203, a pre-FDE 2207, a subcarrier mapper 2205, an IFFT unit 2209, an FTN CP and CS adder 2211, a Tx pulse shaping filter 2213, an FTN CP and CS remover 2215, a channel CP adder 2217, and an up converter 2219.

For example, the pre-FDE 2207 of the transmitter 101 can perform PE in view of ISI caused by the Tx pulse shaping filter 2213 and the channel 105. Here, the transmitter 101 can be referred to as a transmitter according to a PCP-FTN-SC-FDMA transmission scheme.

Comparing with the transmitter 101 of FIG. 14, the transmitter 101 of FIG. 22 further includes the subcarrier mapper 2205. Thus, hereinafter, the subcarrier mapper 2205 is described in detail, while the description of the other components (the FFT unit 2203, the pre-FDE 2207, the IFFT unit 2209, the FTN CP and CS adder 2211, the Tx pulse shaping filter 2213, the FTN CP and CS remover 2215, the channel CP adder 2217, and the up converter 2219) is omitted.

Describing each component, the subcarrier mapper 2205 can receive a frequency-domain transmitted signal block from the FFT unit 2203, can map the transmitted signal block to a subcarrier, and can transmit the mapped transmitted signal block to the pre-FDE 2207.

The controller 2201 can control overall operations of the transmitter 101. For example, the controller 2201 can control the FFT unit 2203, the pre-FDE 2207, the subcarrier mapper 2205, the IFFT unit 2209, the FTN CP and CS adder 2211, the Tx pulse shaping filter 2213, the FTN CP and CS remover 2215, the channel CP adder 2217, and the up converter 2219.

For example, the controller 2201 can map a frequency-domain transmitted signal block to a subcarrier and can pre-equalize the mapped transmitted signal block in view of ISI caused by the channel 105 and the Tx pulse shaping filter 2213 through the FFT unit 2203, the pre-FDE 2207, the subcarrier mapper 2205, and the IFFT unit 2209. The controller 2201 can add an FTN CP and CS to the transmitted signal block through the FTN CP and CS adder 2211. The controller 2201 can filter the FTN CP and CS-added transmitted signal block with a pulse-shaped filter for sampling according to FTN and can perform FTN through the Tx pulse shaping filter 2213. Here, the FTN CP and CS of the FTN-applied transmitted signal block can include IBI caused by the Tx pulse shaping filter 2213 performing FTN. The controller 2201 can remove the FTN CP and CS from the FTN-applied transmitted signal block through the FIN CP and CS remover 2215.

The controller 2201 can add a channel CP to the FTN CP and CS-removed transmitted signal block through the channel CP adder 2217. The controller 2201 can up-convert the channel CP-added transmitted signal block into an RF through the up converter 2219 and can transmit the transmitted signal block to the receiver 103 through the channel 105.

Figure 23:
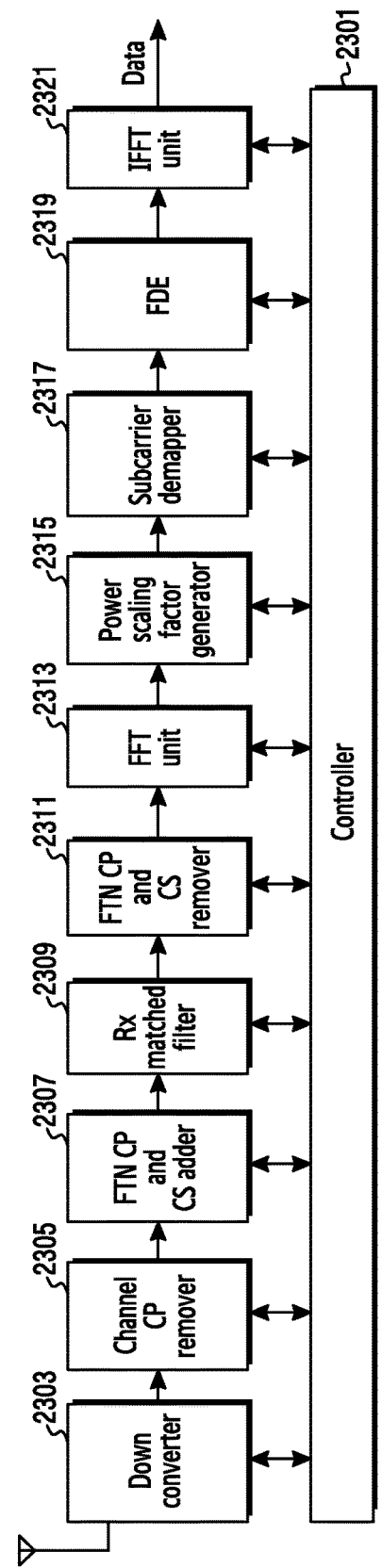
FIG. 23 is a block diagram of a receiver according to the ninth exemplary embodiment of the present disclosure.

FIG. 23 is a block diagram of a receiver according to the ninth exemplary embodiment of the present disclosure.

Referring to FIG. 23, a receiver 103 can include a controller 2301, a down converter 2303, a channel CP remover 2305, an FTN CP and CS adder 2307, an Rx matched filter 2309, an FTN CP and CS remover 2311, an FFT unit 2313, a power scaling factor generator 2315, a subcarrier demapper 2317, an FDE 2319, and an IFFT unit 2321.

For example, when the receiver 103 is a receiver corresponding to the transmitter 101 of FIG. 22, the receiver 103 can be referred to as a receiver according to the PCP-FDE-SC-FDMA transmission scheme.

Comparing with the receiver 103 of FIG. 15, the receiver 103 of FIG. 23 further includes the subcarrier demapper 2317. Thus, hereinafter, the description of the components (for example, the down converter 2303, the channel CP remover 2305, the FTN CP and CS adder 2307, the Rx matched filter 2309, the FTN CP and CS remover 2311, the FFT unit 2313, the power scaling factor generator 2315, the FDE 2319, and the IFFT unit 2321) other than the subcarrier demapper 2317 is omitted.

Describing each component, the subcarrier demapper 2317 can receive a received signal block with a compensated signal size from the power scaling factor generator 2315, can demap a subcarrier from the received signal block, and can transmit the demapped received signal block to the FDE 2319.

The controller 2301 can control overall operations of the receiver 103. For example, the controller 2301 can control the down converter 2303, the channel CP remover 2305, the FTN CP and CS adder 2307, the Rx matched filter 2309, the FTN CP and CS remover 2311, the FFT unit 2313, the power scaling factor generator 2315, the subcarrier demapper 2317, the FDE 2319, and the IFFT unit 2321.

For example, the controller 2301 can down-convert a received signal block into a base band through the down converter 2303. The controller 2301 can remove a channel CP from the converted received signal block through the channel CP remover 2305. The controller 2301 can add an FTN CP and CS to the channel CP-removed received signal block through the FTN CP and CS adder 2307. The controller 2301 can filter the FTN CP and CS-added received signal block with a pulse-shaped filter for sampling according to FTN and can perform FTN through the Rx matched filter 2309. Here, the FTN CP and CS of the FTN-applied received signal block can include IBI caused by the Rx matched filter 2309 performing FTN.

The controller 2301 can remove the FTN CP and CS from the FTN-applied received signal block through FTN CP and CS remover 2311. The controller 2301 can convert the FTN CP and CS-removed received signal block from the time domain to the frequency domain through the FFT unit 2313. The controller 2301 can generate a power scaling factor for the frequency-domain received signal block and can compensate for the signal size of the received signal block based on the generated power scaling factor through the power scaling factor generator 2315. The controller 2301 can demap a subcarrier from the compensated received signal block through the subcarrier demapper 2317. The controller 2301 can equalize the demapped received signal block in view of ISI caused by the Rx matched filter 2309 through the FDE 2319. The controller 2301 can convert the equalized received signal block from the frequency domain to the time domain through the IFFT unit 2321. The controller 2301 can decode the converted time-domain received signal block to reconstruct data.

Figure 24:
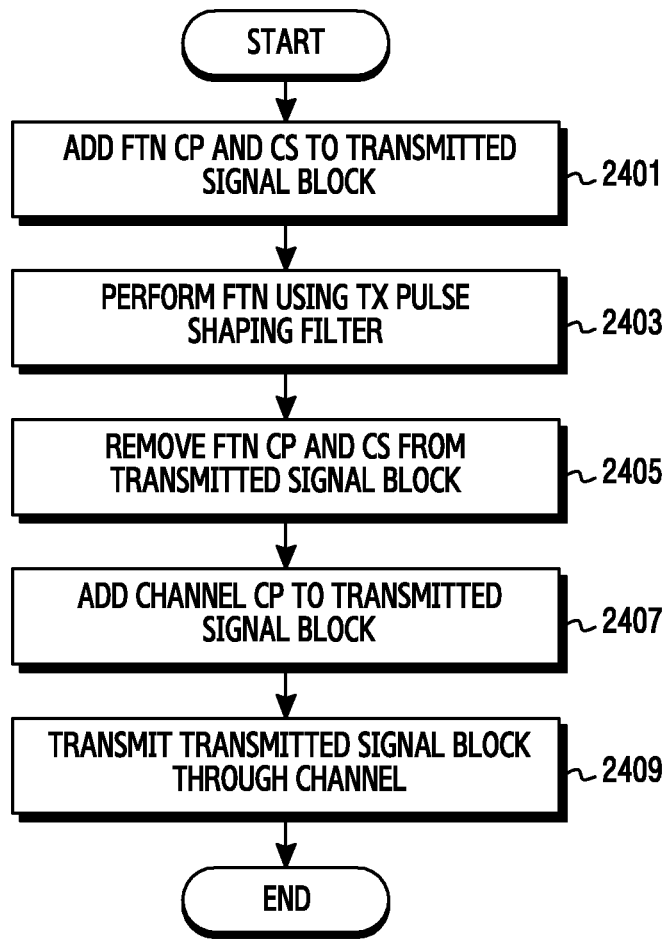
FIG. 24 is a flowchart illustrating that the transmitter according to the first exemplary embodiment of the present disclosure transmits data.

FIG. 24 is a flowchart illustrating that the transmitter according to the first exemplary embodiment of the present disclosure transmits data. For example, the transmitter 101 can be a transmitter according to an FTN-SC-FDE or FTN-SC-FDMA transmission scheme.

Referring to FIG. 24, the controller 201 (or controller 1601) can add an FTN CP and CS to a transmitted signal block in operation 2401, and can proceed to operation 2403. For example, the controller 201 can add the FTN CP and CS to the transmitted signal block using Equation 1. For example, the length of each of the CP and CS can be determined on the performance of the Tx pulse shaping filter 205 (or 1611) of the transmitter 101. Alternatively, the length of each of the CP and CS can be determined on the length of a tap of the Tx pulse shaping filter 205.

The controller 201 can filter the FTN CP and CS-added transmitted signal block with a pulse-shaped filter for sampling according to FTN in view of FTN signaling through the Tx pulse shaping filter 205 in operation 2403, and can proceed to operation 2405. For example, the controller 201 can apply FTN to the FTN CP and CS-added transmitted signal block using Equation 2. For example, the FTN CP and CS after filtering can include IBI caused by the Tx pulse shaping filter 205.

The controller 201 can remove the FTN CP and CS from the transmitted signal block, which is filtered with the pulse-shaped filter for sampling according to FTN, in operation 2405, and can proceed to operation 2407. For example, the controller 201 can remove, using Equation 3, the FTN CP and CS from the transmitted signal block, which is filtered with the pulse-shaped filter for sampling according to FTN.

The controller 201 can add a channel CP to the FTN CP and CS-removed transmitted signal block in operation 2407, and can proceed to operation 2409. Here, the channel CP is a GI for preventing IBI caused by the channel 105. For example, the controller 201 can add the channel CP to the FTN CP and CS-removed transmitted signal block using Equation 4. For example, the length of the channel CP can be determined based on a channel characteristic. Alternative, the length of the channel CP can be can be determined based on the length of a CIR.

In operation 2409, the controller 201 can transmit the channel CP-added transmitted signal block. For example the controller 201 can up-convert the channel CP-added transmitted signal block into an RF and can transmit the transmitted signal block through the channel 105.

Figure 25:
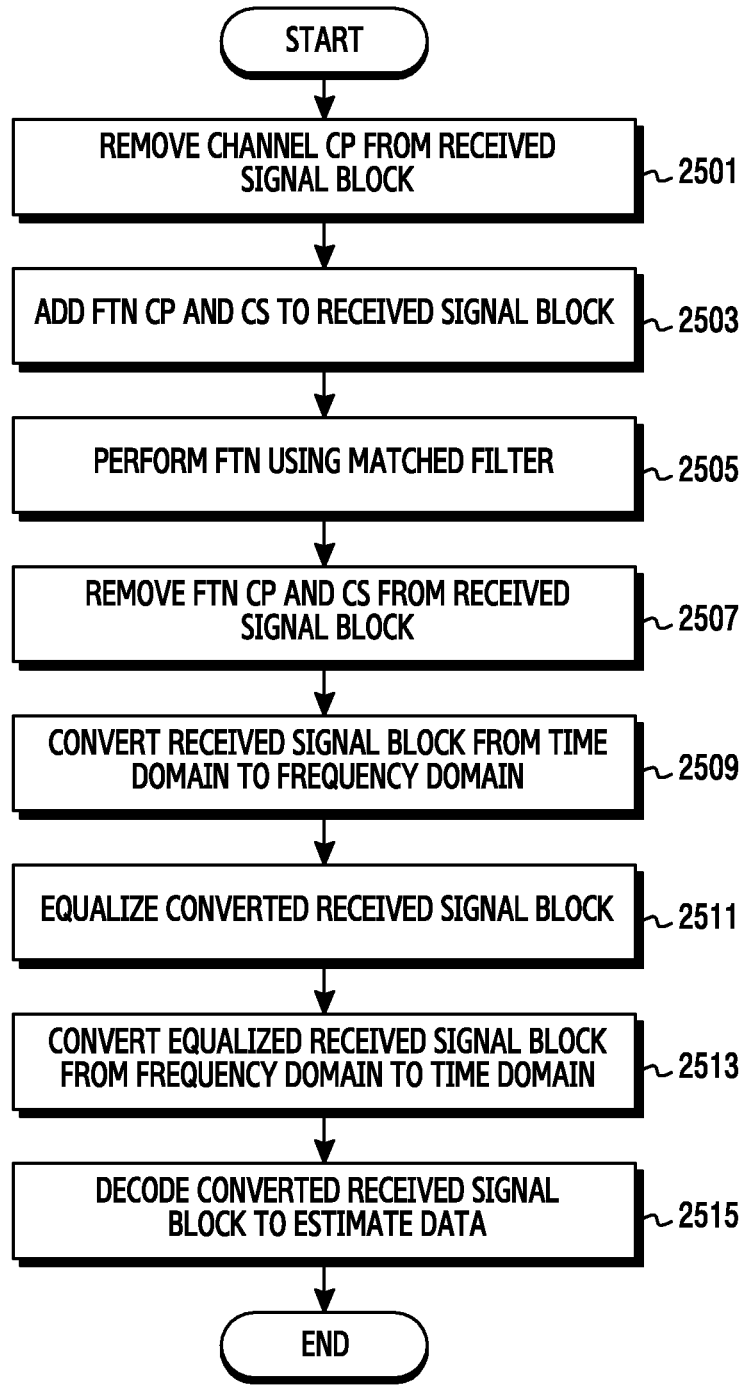
FIG. 25 is a flowchart illustrating that the receiver according to the first exemplary embodiment of the present disclosure receives data.

FIG. 25 is a flowchart illustrating that the receiver according to the first exemplary embodiment of the present disclosure receives data. For example, the receiver 103 can be a receiver according to the FTN-SC-FDE or FTN-SC-FDMA transmission scheme.

Referring to FIG. 25, the controller 401 (or controller 1701) can remove a channel CP from a received signal block received through the channel 105 in operation 2501, and can proceed to operation 2503. For example, the controller 401 can receive the received signal block through the channel 105 and can down-convert the received signal block from an ultrahigh frequency to a base band. For example, the ultrahigh frequency can be a frequency of 3 to 60 GHz. For example, the controller 401 can remove the channel CP from the received signal block using Equation 7.

The controller 401 can add an FTN CP and CS to the channel CP-removed received signal block in operation 2503, and can proceed to operation 2505. For example, the controller 401 can add the FTN CP and CS to the channel CP-removed received signal block using Equation 8. For example, the length of each of the FTN CP and CS can be determined based on the performance of the Rx matched filter 409 (or 1709). Alternatively, the length of each of the FTN CP and CS can be determined based on the length of a tap of the Rx matched filter 409 (or 1709). Alternatively, the length of each of the FTN CP and CS can be can be the same as, or different from, the length of each of the FTN CP and CS added to the transmitted signal block in the transmitter 101.

The controller 401 can filter the FTN CP and CS-added received signal block with a pulse-shaped filter for sampling according to FTN in view of FTN signaling through the Rx matched filter 409 in operation 2505, and can proceed to operation 2507. For example, the controller 401 can apply FTN to the FTN CP and CS-added received signal block using Equation 9. For example, the FTN CP and CS after filtering can include IBI caused by the Rx matched filter 409.

The controller 401 can remove the FTN CP and CS from the filtered received signal block in operation 2507, and can proceed to operation 2509. For example, the controller 401 can remove the FTN CP and CS from the filtered received signal block using Equation 10.

The controller 401 can convert the FTN CP and CS-removed received signal block from the time domain to the frequency domain in operation 2509, and can proceed to operation 2511. For example, the controller 401 can apply a DFT or FFT algorithm to the FTN CP and CS-removed received signal block, thereby converting the received signal block from the time domain to the frequency domain. For example, the frequency-domain received signal block can be represented by Equation 13.

The controller 401 can equalize the converted received signal block in operation 2511, and can proceed to operation 2513. For example, the controller 401 can equalize the received signal block to eliminate ISI caused by the channel 105, the Tx pulse shaping filter 205, and the Rx matched filter 409.

The controller 401 can convert the equalized received signal block from the frequency domain to the time domain in operation 2513, and can proceed to operation 2515. For example, the controller 401 can apply an IDFT or IFFT algorithm to the equalized received signal block, thereby converting the equalized received signal block from the frequency domain to the time domain. For example, the controller 401 can convert the equalized received signal block from the frequency domain to the time domain using Equation 17. For example, the time-domain received signal block can be estimated data.

In operation 2515, the controller 401 can decode the converted time-domain received signal block to reconstruct data.

Figure 26:
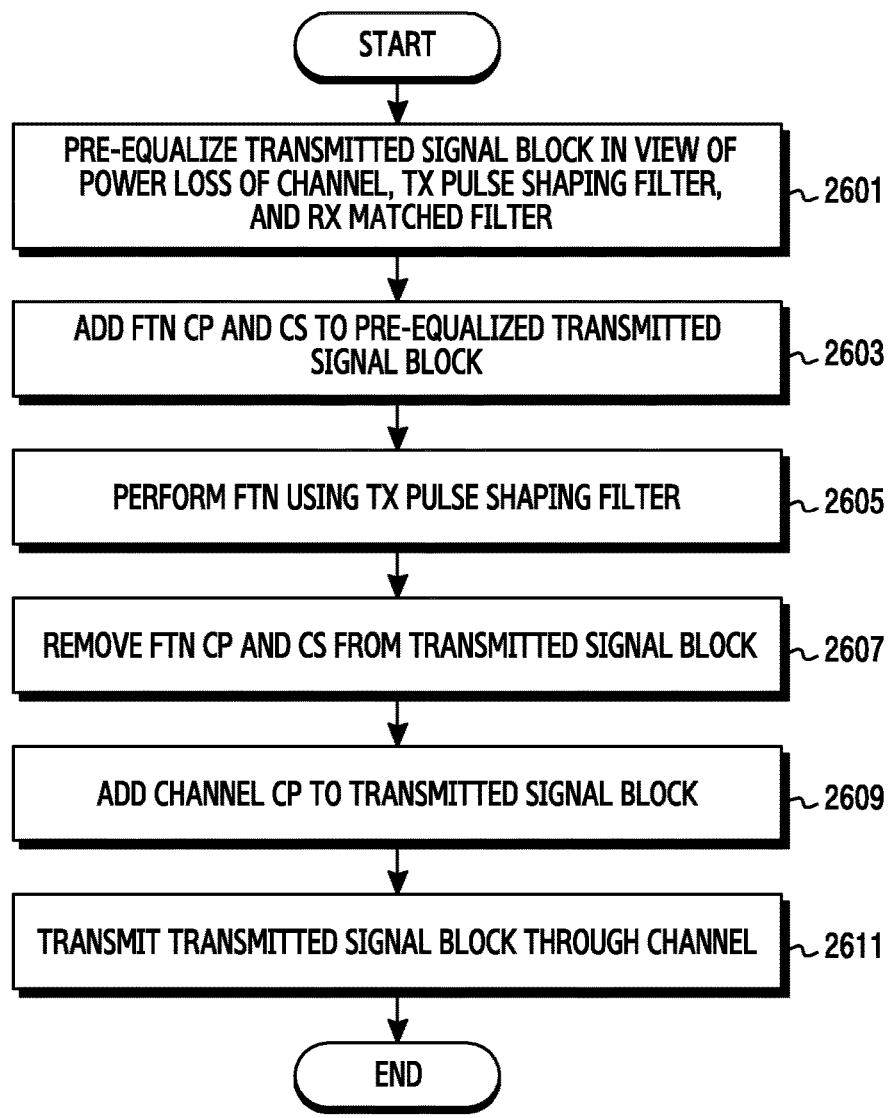
FIG. 26 is a flowchart illustrating that the transmitter according to the third exemplary embodiment of the present disclosure transmits data.

FIG. 26 is a flowchart illustrating that the transmitter according to the third exemplary embodiment of the present disclosure transmits data. For example, the transmitter 101 can be a transmitter according to a PE-FTN-SC-FDE or PE-FTN-SC-FDMA transmission scheme.

Referring to FIG. 26, the controller 1001 (or 1801) can pre-equalize a transmitted signal block to prevent ISI by the channel 105, the Tx pulse shaping filter 1011 (or 1813), and the Rx matched filter 1109 (or 1909) corresponding to the Tx pulse shaping filter 1011 in operation 2601, and can proceed to operation 2603.

The controller 1001 can add an FTN CP and CS to the pre-equalized transmitted signal block in operation 2603, and can proceed to operation 2605. For example, the controller 1001 can add the FTN CP and CS to the transmitted signal block using Equation 1. For example, the length of each of the CP and CS can be determined based on the performance of the Tx pulse shaping filter 1011 (or 1813). Alternatively, the length of each of the CP and CS can be determined based on the length of a tap of the Tx pulse shaping filter 1011.

Subsequently, the controller 1001 can sequentially perform operations 2605 to 2611. Since operations 2605 to 2611 correspond to operations 2403 to 2409 of FIG. 24, respectively, a detailed description of operations 2605 to 2611 is omitted.

Figure 27:
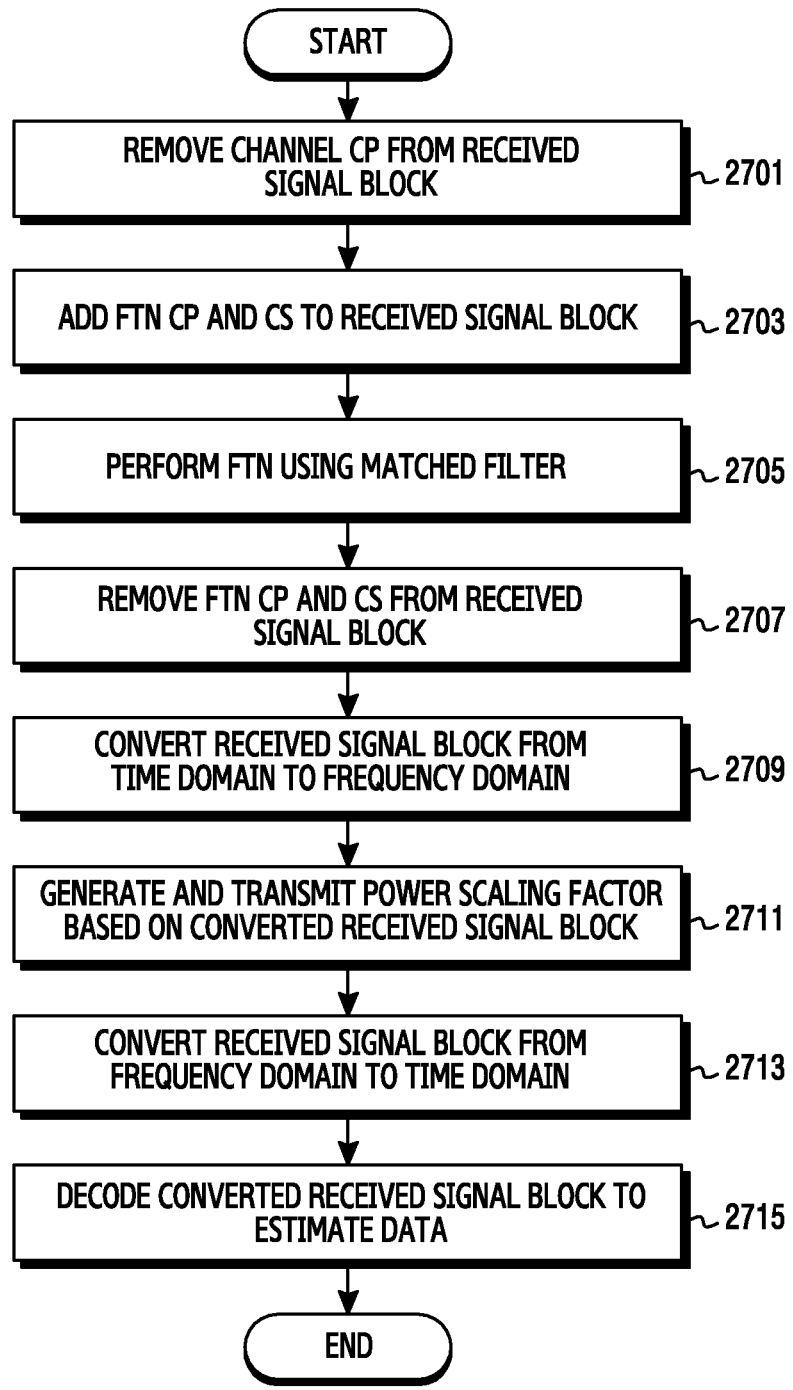
FIG. 27 is a flowchart illustrating that the receiver according to the third exemplary embodiment of the present disclosure receives data.

FIG. 27 is a flowchart illustrating that the receiver according to the third exemplary embodiment of the present disclosure receives data. For example, the receiver 103 can be a receiver according to the PE-FTN-SC-FDE or PE-FTN-SC-FDMA transmission scheme.

Referring to FIG. 27, the controller 1101 (or 1901) can sequentially perform operations 2701 to 2707. Since operations 2701 to 2707 correspond to operations 2501 to 2507 of FIG. 25, respectively, a detailed description of operations 2701 to 2707 is omitted.

The controller 1101 can convert an FTN CP and CS-removed received signal block from the time domain to the frequency domain in operation 2709, and can proceed to operation 2711. For example, the controller 1101 can apply a DFT or FFT algorithm to the FTN CP and CS-removed received signal block, thereby converting the received signal block from the time domain to the frequency domain. For example, the frequency-domain received signal block can be a received signal block that is pre-equalized to prevent ISI by the channel 105, the Tx pulse shaping filter 1011 (or 1813), and the Rx matched filter 1109 (or 1909). For example, the frequency-domain received signal block can be represented by Equation 19. For example, the controller 1101 can generate CSI for the frequency-domain received signal block and can feed the generated CSI back to the transmitter 101.

The controller 1101 can compensate for the signal size of the converted frequency-domain received signal block in operation 2711, and can proceed to operation 2713. For example, the controller 1101 can determine a power scaling factor for the converted received signal block and can amplify the converted received signal block based on the determined power scaling factor.

The controller 1101 can convert the received signal block from the frequency domain to the time domain in operation 2713, and can proceed to operation 2715. For example, the controller 1101 can apply an IDFT or IFFT algorithm to the received signal block, thereby converting the received signal block from the frequency domain to the time domain. For example, the controller 1101 can convert the equalized received signal block from the frequency domain to the time domain using Equation 23. For example, the time-domain received signal block can be estimated data.

In operation 2715, the controller 1101 can decode the converted time-domain received signal block to reconstruct data.

Figure 28:
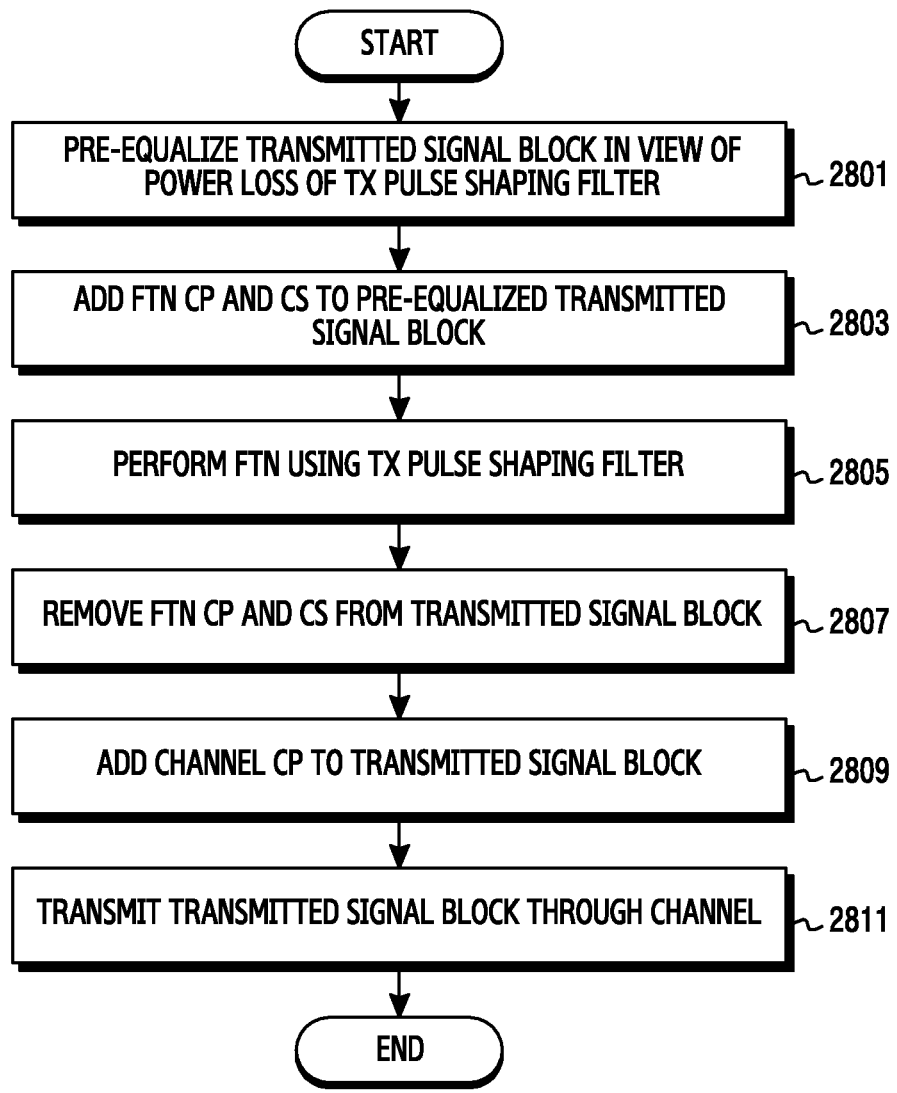
FIG. 28 is a flowchart illustrating that the transmitter according to the fourth exemplary embodiment of the present disclosure transmits data.

FIG. 28 is a flowchart illustrating that the transmitter according to the fourth exemplary embodiment of the present disclosure transmits data. For example, the transmitter 101 can be a transmitter according to an POP-FTN-SC-FDE or POP-FTN-SC-FDMA transmission scheme.

Referring to FIG. 28, the controller 1201 (or 2001) can pre-equalize a transmitted signal block to prevent ISI by the Tx pulse shaping filter 1211 (or 2013) in operation 2801, and can proceed to operation 2803.

The controller 1201 can add an FTN CP and CS to the pre-equalized transmitted signal block in operation 2803, and can proceed to operation 2805. For example, the controller 1201 can add the FTN CP and CS to the transmitted signal block using Equation 1. For example, the length of each of the CP and CS can be determined based on the performance of the Tx pulse shaping filter 1211 (or 2013). Alternatively, the length of each of the CP and CS can be determined based on the length of a tap of the Tx pulse shaping filter 1211.

Subsequently, the controller 1201 can sequentially perform operations 2805 to 2811. Since operations 2805 to 2811 correspond to operations 2403 to 2409 of FIG. 24, respectively, a detailed description of operations 2805 to 2811 is omitted.

Figure 29:
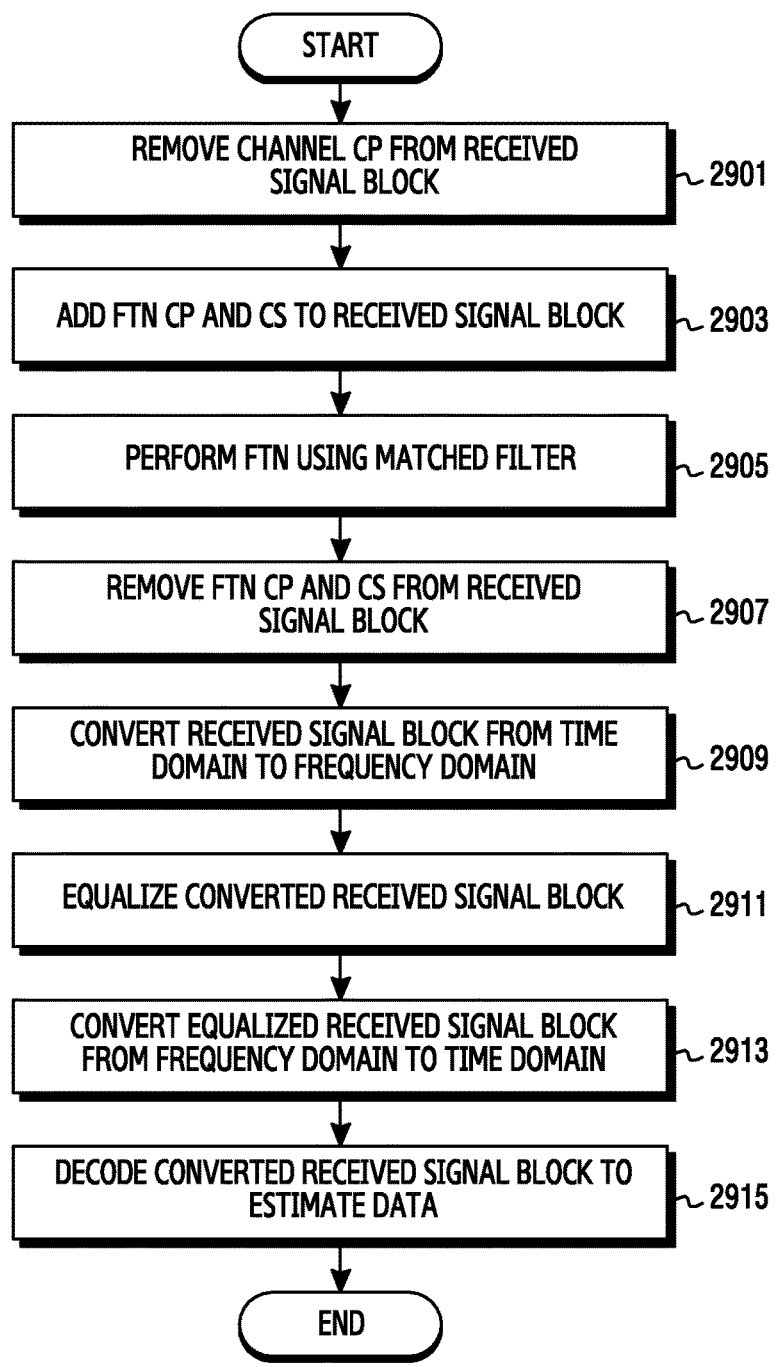
FIG. 29 is a flowchart illustrating that the receiver according to the fourth exemplary embodiment of the present disclosure receives data.

FIG. 29 is a flowchart illustrating that the receiver according to the fourth exemplary embodiment of the present disclosure receives data. For example, the receiver 103 can be a receiver according to the POP-FTN-SC-FDE or POP-FTN-SC-FDMA transmission scheme.

Referring to FIG. 29, the controller 1301 (or 2101) can sequentially perform operations 2901 to 2907. Since operations 2901 to 2907 correspond to operations 2501 to 2507 of FIG. 25, respectively, a detailed description of operations 2901 to 2907 is omitted.

The controller 1301 can convert an FTN CP and CS-removed received signal block from the time domain to the frequency domain in operation 2909, and can proceed to operation 2911. For example, the controller 1301 can apply a DFT or FFT algorithm to the FTN CP and CS-removed received signal block, thereby converting the received signal block from the time domain to the frequency domain. For example, the frequency-domain received signal block can be a received signal block that is pre-equalized to prevent ISI by the Tx pulse shaping filter 1211 (or 2013). For example, the frequency-domain received signal block can be represented by Equation 25.

The controller 1301 can equalize the converted received signal block in operation 2911, and can proceed to operation 2913. For example, the controller 1301 can equalize the received signal block to eliminate ISI caused by the channel 105 and the Rx matched filter 1309 (or 2109). Here, since the converted received signal block is pre-equalized to prevent ISI by the Tx pulse shaping filter 1211, the controller 1301 can equalize the received signal block without considering ISI by the Tx pulse shaping filter 1211.

The controller 1301 can convert the equalized received signal block from the frequency domain to the time domain in operation 2913, and can proceed to operation 2915. For example, the controller 1301 can apply an IDFT or IFFT algorithm to the received signal block, thereby converting the received signal block from the frequency domain to the time domain. For example, the controller 1301 can convert the equalized received signal block from the frequency domain to the time domain using Equation 30. For example, the time-domain received signal block can be estimated data.

In operation 2915, the controller 1301 can decode the converted time-domain received signal block to reconstruct data.

Figure 30:
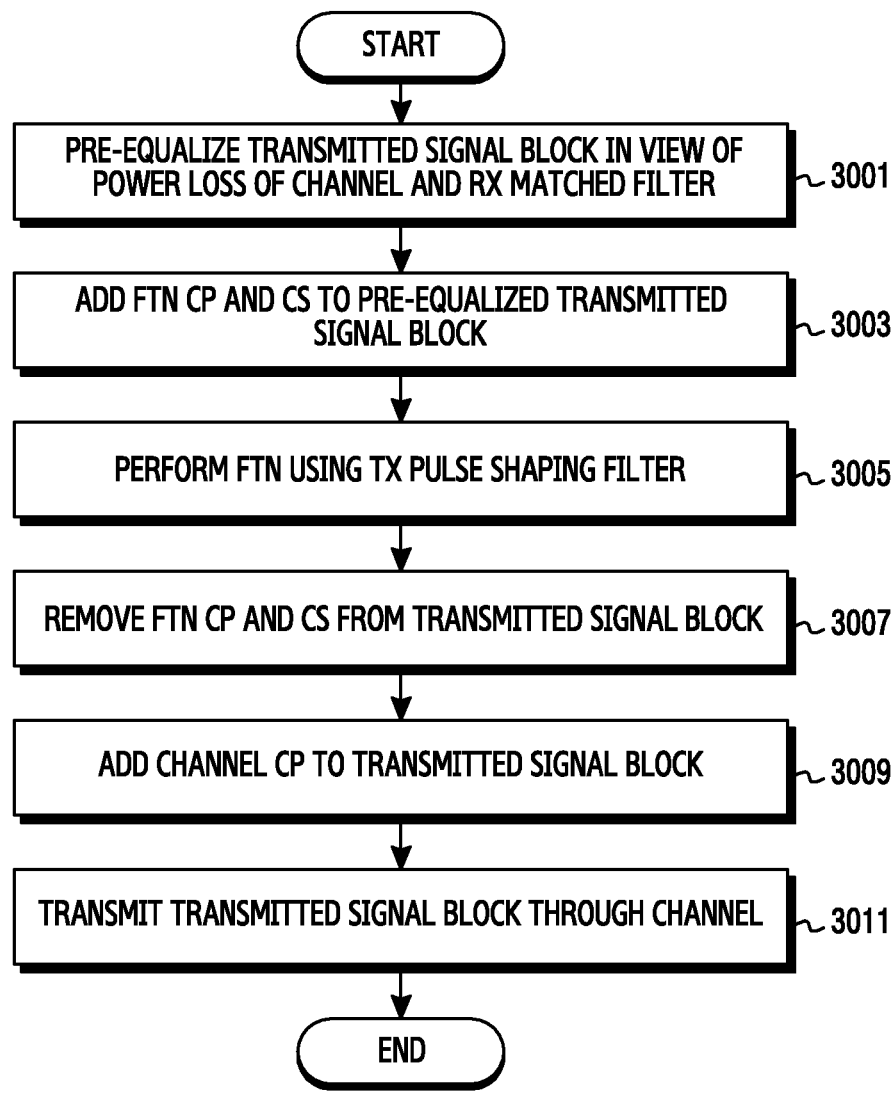
FIG. 30 is a flowchart illustrating that the transmitter according to the fifth exemplary embodiment of the present disclosure transmits data.

FIG. 30 is a flowchart illustrating that the transmitter according to the fifth exemplary embodiment of the present disclosure transmits data. For example, the transmitter 101 can be a transmitter according to an PCP-FTN-SC-FDE or PCP-FTN-SC-FDMA transmission scheme.

Referring to FIG. 30, the controller 1401 (or 2201) can pre-equalize a transmitted signal block to prevent ISI by the channel 105 and the Tx pulse shaping filter 1411 (or 2213) in operation 3001, and can proceed to operation 3003.

The controller 1401 can add an FTN CP and CS to the pre-equalized transmitted signal block in operation 3003, and can proceed to operation 3005. For example, the controller 1401 can add the FTN CP and CS to the transmitted signal block using Equation 1. For example, the length of each of the CP and CS can be determined based on the performance of the Tx pulse shaping filter 1411 (or 2213). Alternatively, the length of each of the CP and CS can be determined based on the length of a tap of the Tx pulse shaping filter 1411.

Subsequently, the controller 1401 can sequentially perform operations 3005 to 3011. Since operations 3005 to 3011 correspond to operations 2403 to 2409 of FIG. 24, respectively, a detailed description of operations 3005 to 3011 is omitted.

Figure 31:
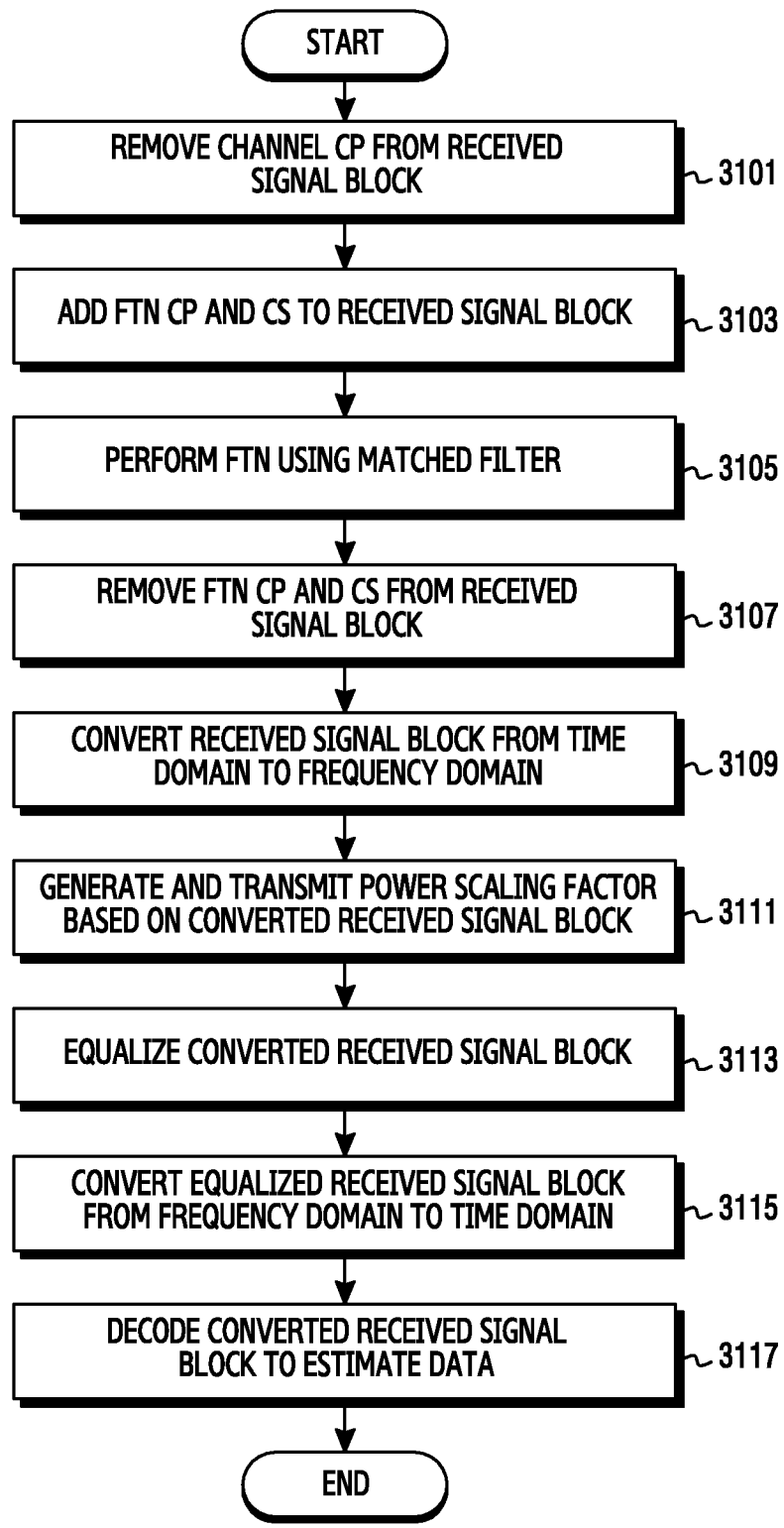
FIG. 31 is a flowchart illustrating that the receiver according to the fifth exemplary embodiment of the present disclosure receives data.
Figure 32:
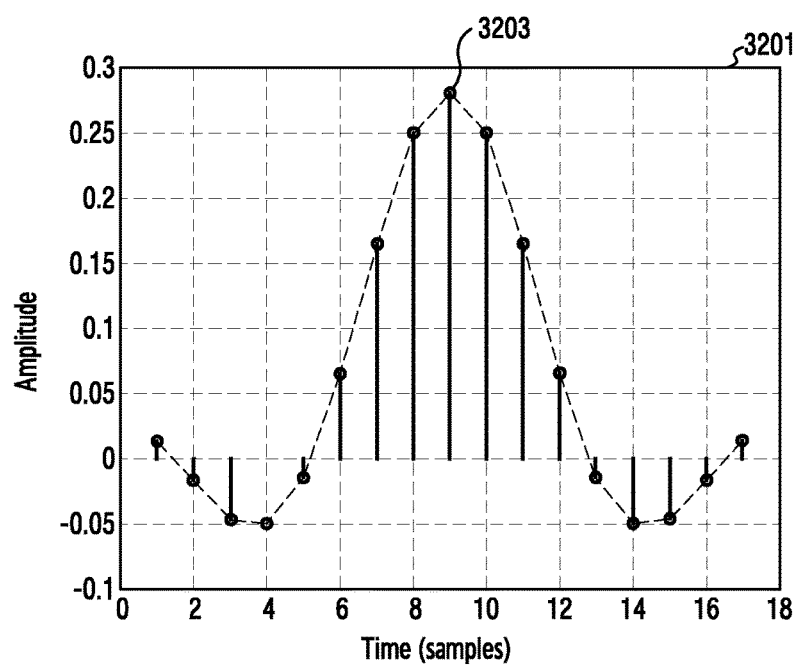
FIG. 32 is a graph illustrating a sampling result of a transmit (Tx) pulse shaping filter according to an exemplary embodiment of the present disclosure.

FIG. 31 is a flowchart illustrating that the receiver according to the fifth exemplary embodiment of the present disclosure receives data. For example, the receiver 103 can be a receiver according to the PCP-FTN-SC-FDE or PCP-FTN-SC-FDMA transmission scheme.

Referring to FIG. 31, the controller 1501 (or 2301) can sequentially perform operations 3101 to 3107. Since operations 3101 to 3107 correspond to operations 2501 to 2507 of FIG. 25, respectively, a detailed description of operations 3101 to 3107 is omitted.

The controller 1501 can convert an FTN CP and CS-removed received signal block from the time domain to the frequency domain in operation 3109, and can proceed to operation 3111. For example, the controller 1501 can apply a DFT or FFT algorithm to the FTN CP and CS-removed received signal block, thereby converting the received signal block from the time domain to the frequency domain. For example, the frequency-domain received signal block can be a received signal block that is pre-equalized to prevent ISI by the channel 105 and the Tx pulse shaping filter 1411 (or 2113). For example, the frequency-domain received signal block can be represented by Equation 33.

The controller 1501 can compensate for the signal size of the converted frequency-domain received signal block in operation 3111, and can proceed to operation 3113. For example, the controller 1501 can determine a power scaling factor for the converted received signal block and can amplify the converted received signal block based on the determined power scaling factor.

The controller 1501 can equalize the converted received signal block in operation 3113, and can proceed to operation 3115. For example, the controller 1501 can equalize the received signal block to eliminate ISI caused by the Rx matched filter 1509 (or 2309). Here, since the converted received signal block is pre-equalized to prevent ISI by the channel 105 and the Tx pulse shaping filter 1411, the controller 1501 can equalize the received signal block without considering ISI by the channel 105 and the Tx pulse shaping filter 1411.

The controller 1501 can convert the equalized received signal block from the frequency domain to the time domain in operation 3115, and can proceed to operation 3117. For example, the controller 1501 can apply an IDFT or IFFT algorithm to the received signal block, thereby converting the received signal block from the frequency domain to the time domain. For example, the controller 1501 can convert the equalized received signal block from the frequency domain to the time domain using Equation 36. For example, the time-domain received signal block can be estimated data.

In operation 3117, the controller 1501 can decode the converted time-domain received signal block to reconstruct data.

According to one exemplary embodiment of the present disclosure, the positions of the pre-FDEs and the subcarrier mappers that are included in the transmitters can be switched with each other. According to one exemplary embodiment of the present disclosure, the positions of the subcarrier demappers and the FDEs that are included in the receivers can be switched with each other according to the positions of the pre-FDEs and the subcarrier mappers that are included in the transmitters. According to one exemplary embodiment of the present disclosure, although the transmitters and the receivers are illustrated as including one antenna, the transmitters and the receivers can include a plurality of antennas. Thus, the present description can be employed for diverse operations through a plurality of antennas, for example, an MIMO operation.

An exemplary embodiment of the present disclosure can eliminate IBI from a block using addition and removal of symbols.

Another exemplary embodiment of the present disclosure can equalize a block in view of both ISI caused by FTN and ISI caused by a channel, thereby reducing the computational complexity of a receiver.

Further, still another exemplary embodiment of the present disclosure can transmit a block via PE in view of ISI, thereby reducing the computational complexity of a receiver.

In addition yet another exemplary embodiment of the present disclosure may allow a transmitter to pre-equalize a block in view of ISI and may allow a receiver to additionally equalize the block in view of remaining ISI, thereby reducing the computational complexity of the receiver.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An operating method for a transmitter, the method comprising:
adding symbols to both ends of a transmitted signal block;
filtering the transmitted signal block;
removing the symbols from the filtered transmitted signal block; and
transmitting the transmitted signal block to a receiver through a channel.

2. The method of claim 1, wherein the adding comprises:
pre-equalizing the transmitted signal block in view of inter-symbol interference caused by at least one of the channel, a pulse shaping filter of the transmitter and a matched filter of the receiver; and
adding the symbols to the pre-equalized transmitted signal block.

3. The method of claim 2, wherein the pre-equalizing comprises pre-equalizing the transmitted signal block in view of inter-symbol interference caused by the channel and the pulse shaping filter.

4. The method of claim 2, wherein the pre-equalizing comprises pre-equalizing the transmitted signal block in view of inter-symbol interference caused by the channel, the pulse shaping filter, and the matched filter.

5. The method of claim 1, wherein each of the symbols has a length determined based on performance of a pulse shaping filter of the transmitter.

6. A transmitter comprising:
a symbol adder;
a symbol remover; and
a controller configured to:
control the symbol adder to add symbols to both ends of a transmitted signal block;
filter the transmitted signal block;
control the symbol remover to remove the symbols from the filtered transmitted signal block; and
transmit the transmitted signal block to a receiver through a channel.

7. The transmitter of claim 6, further comprising a pre-equalizer, wherein the controller is further configured to, through the pre-equalizer, pre-equalize the transmitted signal block in view of inter-symbol interference caused by at least one of the channel, a pulse shaping filter of the transmitter, or a matched filter of the receiver, and to add the symbols to the pre-equalized transmitted signal block.

8. The transmitter of claim 7, wherein the controller is further configured to pre-equalize the transmitted signal block in view of inter-symbol interference caused by the channel and the pulse shaping filter.

9. The transmitter of claim 7, wherein the controller is further configured to pre-equalize the transmitted signal block in view of inter-symbol interference caused by the channel, the pulse shaping filter, and the matched filter.

10. The transmitter of claim 6, wherein each of the symbols has a length determined based on performance of a pulse shaping filter of the transmitter.

11. A receiver comprising:
a symbol adder;
a symbol remover; and
a controller configured to:
receive a received signal block from a transmitter through a channel;
control the symbol adder to add symbols to both ends of the received signal block;
filter the received signal block;
control the symbol remover to remove the symbols from the filtered received signal block; and
reconstruct data from the received signal block.

12. The receiver of claim 11, wherein the received signal block is configured to be pre-equalized in view of inter-symbol interference caused by at least one of the channel, a pulse shaping filter of the transmitter, and a matched filter of the receiver.

13. The receiver of claim 12, further comprising an equalizer, wherein the controller is further configured to, through the equalizer, equalize the received signal block in view of inter-symbol interference caused by the channel and the matched filter when the received signal block is pre-equalized in view of inter-symbol interference by the pulse shaping filter, and to reconstruct data from the equalized received signal block.

14. The receiver of claim 12, further comprising an equalizer, wherein the controller is further configured to, through the equalizer, equalize the received signal block in view of inter-symbol interference caused by the matched filter when the received signal block is pre-equalized in view of inter-symbol interference by the pulse shaping filter and the channel, and to reconstruct data from the equalized received signal block.

15. The receiver of claim 11, wherein each of the symbols has a length determined based on performance of a matched filter of the receiver.

* * * * *